United States Patent [19]
Schaefer et al.

[11] Patent Number: 6,141,679
[45] Date of Patent: Oct. 31, 2000

[54] HIGH PERFORMANCE DISTRIBUTED TRANSACTION PROCESSING METHODS AND APPARATUS

[75] Inventors: Diane E. Schaefer, North Wales; Robert S. Baker, Telford; Steven L. Kayser, Paoli, all of Pa.

[73] Assignee: Unisys Corporation, Blue Bell, Pa.

[21] Appl. No.: 09/020,213

[22] Filed: Feb. 6, 1998

[51] Int. Cl.[7] .................................................. G06F 15/16
[52] U.S. Cl. .......................................... 709/201; 709/230
[58] Field of Search ..................................... 709/101, 201, 709/203, 230

[56] References Cited

U.S. PATENT DOCUMENTS

| | | | |
|---|---|---|---|
| 5,586,312 | 12/1996 | Johnson et al. | 395/610 |
| 5,680,610 | 10/1997 | Smith et al. | 395/610 |
| 5,754,772 | 5/1998 | Leaf | 395/200.33 |
| 5,933,833 | 7/1999 | Freund et al. | 707/202 |

OTHER PUBLICATIONS

Lejeune et al, "A Transaction Processing Toolkit for ACTS–ACTranS," http://ermis.algo.com.gr/acts/dolphin/cd–rom/html/actrans/actrand2/d2/d2e.html, Mar. 1996.

David Kahaner, "Trans Info Proc of Japan, vol. 34 #3,5,6,7,8, titles, abstracts," http://www.mcc.com/projects/ilo/wais/atip/tipsj34.3–8, Sep. 1993.

Kreuz et al, "A Parallel Application Protocol Implementation for High Performance Networking," http://www.ti5.tu–harburg.de/Publication/1995/Paper/KrV095/, 1995.

Chimia et al, "A Transaction Processing Toolkit for ACTS–ACTranS," http://ermis.algo.com.gr/acts/dolphin/cd–rom/html/actrans/actrand2/d2/d2e.html, Feb. 1996.

*Primary Examiner*—Mehmet B. Geckil
*Attorney, Agent, or Firm*—R. L. Adornato; M. T. Starr; L. A. Rode

[57] ABSTRACT

Multiple OSI TP service requests to which a particular AP-CRM interface call is mapped, and which are normally processed as individual events by an OSI TP protocol machine that conforms to the OSI TP Protocol Specification, are concatenated and processed by a modified OSI TP protocol machine as a single, atomic event. In this manner, performance and throughput are increased, while still maintaining conformance with the OSI TP Standard. Processing of OSI TP service requests will thus be optimized for the particular AP-CRM interface that the distributed transaction processing system supports. A new CRM-OSI TP programming interface is provided in place of the standard XAP-TP programming interface. The new interface maps each service of the particular AP-CRM interface to a respective, single service request of the new interface. Each service request of the new interface represents a concatenation of the OSI TP services to which the corresponding service of the particular AP-CRM is normally mapped.

30 Claims, 10 Drawing Sheets

Microfiche Appendix Included
(1 Microfiche, 45 Pages)

| Start | 1 | 2 | 3 | 18 | 20.1 | 20.3 | 21.1 | 99 |
|---|---|---|---|---|---|---|---|---|
| Predicates | dialogue does not exist | data transfer P.C. with control | data transfer P.C. w/o control | C-PREPARE ind received | tp_prepare req issued C-READY ind awaited | commit indication awaited | Commit cnf awaited | Channel establishment awaited |
| Event | | | | DI Dsup | P.C. w/ control ^Dcr,DI,^Dsup | DI | DI,^Dsup | DI ^Dchat |
| TP-BEGIN-DIALOGUE-REQ TP-DATA-REQ TP-GRANT-CONTROL-REQ (NO TRANSACTION BRANCH) | [INITMACF] [INITDIASB] [VAtppmT] [ABDGCrq] 3 | | | | | | | |
| TP-BEGIN-DIALOGUE-REQ TP-DATA-REQ TP-END-DIALOGUE-REQ (no transaction branch) | [INITMACF] [ABDEDrq] [SDETrqF] | | | | | | | |

*Figure 6*

| State<br>Event | Predicates | 1<br>Free | 1.2<br>AF-BID ind accepted (winner) | 1.3<br>Association pending | 2<br>STRAY | 6<br>BUSY | 9<br>Cleanup RB Confirm Expected | |
|---|---|---|---|---|---|---|---|---|
| SAF-DETACH-ASSOCIATION (free) req | | | Aw | Aap | | ^Adt | | |
| SAF-DETACH-ASSOCIATION (rollback-confirm-expected) req | | | | | ^Aq<br>[RETTOKEN]<br>1 | Aq<br>[DISCARDQ]<br>[RETTOKEN]<br>[RESETS]<br>1 | | |
| | | | | | | ^Aq<br>[VAdtT]<br>9 | | |
| AF-BEGIN-DIALOGUE req<br>AF-BEGIN-DIALOGUE-DATA req<br>AF-BEGIN-DIALOGUE-DATA-GC req<br>AF-TPCALL req<br>AF-BEGIN-DIALOGUE-DEFERE-DATA req<br>AF-BEGIN-DIALOGUE-DEFER-DATA-PREPARE req | | Aw<br>[VadcNEW]<br>[SETCORR]<br>[VAlpiCORR]<br>[VAdtF]<br>[VAnfdT]<br>[PASSTHRU]<br>2 | | | | | | |

*Figure 7*

| pdu combo (decode→pdu_concat) | pdu type (pdu_concat→sacf) | sacf indication type (sacf→macf) | CRM Entry Point (macf→CRM) |
|---|---|---|---|
| begin_dialogue_ri + u_ase_ri | p_tp_bdr_data_ri | si_bdr_data_ind | HPTPX_DIALOGUE_IND flags=NOTRAN SENDONLY |
| begin_dialogue_ri + c_begin_ri + u_ase_ri | p_tp_bdr_cbeg_data_ri | si_bdr_cbeg_data_ind | HPTPX_DIALOGUE_IND flags=SENDONLY ubuf=data |
| begin_dialogue_ri + c_begin_ri + defer_ri + u_ase_ri | p_tp_bdr_cbeg_defer_data_ri | si_bdr_cbeg-defer_data_ind | HPTPX_DIALOGUE_IND flags=SENDONLY ubuf=data |
| begin_dialogue_ri + u_ase_ri + grant_control_ri | p_tp_bdr_data_gc_ri | si_bdr_data_gc_ind | HPTPX_DIALOGUE_IND flags=NOTRAN ubuf=data |
| begin_dialogue_ri + c_begin_ri + defer_ri + u_ase_ri + grant_control_ri | p_tpcall_ri | si_bdr_cbeg_defer_data_gc_ind | HPTPX_DIALOGUE_IND (default) ubuf=data |
| begin_dialogue_ri + c_begin_ri + u_ase_ri + grant_control_ri | p_tp_bdr_cbeg_data_gc_ri | si_bdr_cbeg_data_gc_ind | HPTPX_DIALOGUE_IND (default) ubuf=data |
| begin_dialogue_ri + c_begin_ri + u_ase_ri + defer_prepare_ri | p_tp_bdr_cbeg_data_defer_prepare_ri | si_bdr_cbeg_defer_data_prepare_ind | HPTPX_DIALOGUE_IND flags=TPPREPARE ubuf=data |
| begin_dialogue_ri + u_ase_ri + end_dialogue_ri | p_tp_bdr_data_ed_ri | si_bdr_data_ed_ind | HPTPX_DIALOGUE_IND flags=NOTRAN NOREPLY ubuf=data |
| begin_dialogue_rc | p_tp_begin_dialogue_rc | si_begin_dialogue_cnf | HPTPX_DELIVERIND sptype=diag_cnf |
| begin_dialogue_rc + c_begin_rc | p_tp_bd_cbeg_rc | si_bd_cbeg_cnf | HPTPX_DELIVERIND sptype=diag_cnf |
| begin_dialogue_rc + u_ase_ri + end_dialogue_ri | Two Calls to SACF: 1. p_tp_begin_dialogue_cnf 2. p_tp_data_ed_ri | Two Calls to MACF: 1. si_begin_dialogue_cnf 2. si_data_ed_ind | HPTPX_DELIVERIND sptype=hptpx_data_ir flags=OAM_CLOSEOPT, ubuf=data |

*Figure 8A*

| pdu combo (decode→pdu_concat) | pdu type (pdu_concat→sacf) | sacf indication type (sacf→macf) | CRM Entry Point (macf→CRM) |
|---|---|---|---|
| begin_dialogue_rc + u_ase_ri + grant_control_ri | Two Calls to SACF: 1. p_tp_begin_dialogue_cnf 2. p_tp_data_gc_ri | Two Calls to MACF: 1. si_begin_dialogue_cnf 2. si_data_ed_ind | HPTPX_DELIVERIND sptype=hptpx_data_ind flags=OAM_REPLY ubuf=data |
| begin_dialogue_rc + c_begin_rc + u_ase_ri | p_tp_bd_cbeg_rc_data_ri | si_bd_cbeg_cnf_data_ind | HPTPX_DELIVERIND sptype=hptpx_data_ind ubuf=data |
| begin_dialogue_rc + c_begin_rc + u_ase_ri + c_ready_ri | p_tp_bd_cbeg_rc_data_ready_ri | si_bd_cbeg_cnf_data_ready_ind | HPTPX_DELIVERIND sptype=hptpx_data_ind flags=OAM_READY ubuf=data |
| begin_dialogue_rc + c_begin_rc + u_ase_ri + grant_control_ri | p_tp_bd_cbeg_rc_data_gc_ri | si_bd_cbeg_cnf_data_gc_ind | HPTPX_DELIVERIND sptype=hptpx_data_ind ubuf=data |
| c_rollback_rc (tp_begin_dialogue_rc (accept or reject)) | p_c_rollback_rc | si_begin_dialogue_cnf | HPTPX_DELIVERIND sptype=hptpx_begin_dialogue_cnf |
| c_rollback_ri (tp_begin_dialogue_ri (accept or reject)) | p_c_rollback_ri | si_begin_dialogue_cnf | HPTPX_DELIVERIND sptype=hptpx_begin_dialogue_cnf |
| c_rollback_ri (tp_abort_ri) | p_c_rollback_ri | si_abort_ind | HPTPX_DELIVERIND sptype=hptpx_rollback_ind |
| c_rollback_rc (tp_abort_ri) | p_c_rollback_rc | si_abort_ind | HPTPX_DELIVERIND sptype=hptpx_rollback_ind |
| u_ase_ri + grant_control_ri | p_tp_data_gc_ri | si_data_gc_ind | HPTPX_DELIVERIND sptype=hptpx_data_ind flags=OAM_REPLY, ubuf=data |
| u_ase_ri + end_dialogue_ri | p_tp_data_ed_ri | si_data_ed_ind | HPTPX_DELIVERIND sptype=hptpx_data_ind flags=OAM_CLOSEOPT, ubuf=data |
| u_ase_ri + ready_ri | p_tp_data_ready_ri | si_data_ready_ind | HPTPX_DELIVERIND sptype=hptpx_data_ind flags=OAM_READY, ubuf=data |

*Figure 8B*

| pdu combo (decode→pdu_concat) | pdu type (pdu_concat→sacf) | sacf indication type (sacf→macf) | CRM Entry Point (macf→CRM) |
|---|---|---|---|
| u_ase_ri | p_u_ase_apdu | si_ase_data_ind | HPTPX_DELIVERIND sptype=hptpx_data_ind flags=none (default) ubuf=data |
| u_abort_ri (rollback_ri) | passthrough to MACF | si_abort_ind | HPTPX_DELIVERIND sptype=hptpx_u_abort_ind FLAGS=ROLLBACK ubuf=[data] |
| acse_abort_ri | passthrough to MACF | si_a_abort_ind | HPTPX_DELIVERIND sptype=hptpx_p_abort_ind FLAGS=ROLLBACK |
| c_commit_rc (tp_heuristic_ri) | passthrough to MACF | si_commit_cnf | HPTPX_DELIVERIND sptype=hptpx_commit_complete flags=heuristic_mix or heuristic_hazard |
| c_recover_rc(done) (tp_heuristic_ri) | passthrough to MACF | (pass through to cpm) | HPTPX_DELIVERIND sptype= hptpx_commit_complete_ind flags=heuristic_mix or heuristic_hazard |
| c_rollback_ri | p_c_rollback_ri | si_rollback_ind | HPTPX_DELIVERIND stype=hptpx_rollback_ind |
| c_rollback_rc | p_c_rollback_rc | si_rollback_cnf | HPTPX_DELIVERIND sptype=hptpx_rollback_complete_ind |
| c_commit_ri | p_c_commit_ri | si_commit_ind | HPTPX_DELIVERIND stype=hptpx_commit_ind |
| c_commit_rc | p_c_commit_rc | si_commit_cnf | HPTPX_DELIVERIND sytype=hptpx_commit_complete_ind |
| c_ready_ri | p_c_ready_ri | si_ready_ind | HPTPX_DELIVERIND stype=hptpx_ready_ind |
| defer_ri + c_prepare_ri | p_tp_defer_prepare_ri | si_defer_prepare_ind | HPTPX_DELIVERIND sytype=hptpx_prepare_ind |
| c_prepare_ri | p_c_prepare_ri | si_prepare_ind | HPTPX_DELIVERIND sytype=hptpx_prepare_ind |

*Figure 8C*

HIGH PERFORMANCE DISTRIBUTED TRANSACTION PROCESSING METHODS AND APPARATUS

REFERENCE TO MICROFICHE APPENDICES

The following microfiche appendices form a part of the disclosure of this patent document: Appendix A, "Modified MACF State Table" (pp. 1–29), and Appendix B, "Modified SACF State Table" (pp. 1–14). Both Appendices are provided on the single microfiche filed herewith ("Fiche 1 of 1"), comprising 45 frames in total (excluding the test pattern).

COPYRIGHT NOTICE

A portion of the disclosure of this patent document, including the microfiche appendices, contains material that is subject to copyright protection. The copyright owner has no objection to the facsimile reproduction by anyone of the patent document or the patent disclosure as it appears in the United States Patent & Trademark Office patent file or records, but otherwise reserves all copyright rights whatsoever.

BACKGROUND

1. Field of the Invention

The present invention is directed to distributed transaction processing systems. More particularly, the present invention is directed to methods and apparatus for enhancing the performance of communications between nodes in a distributed transaction processing system that supports the ISO/IEC OSI TP communications protocol.

2. Description of the Prior Art

On-line transaction processing (OLTP) is a technology that has been used successfully for business-critical applications by large enterprises for many years. With OLTP, users at terminals send messages to application programs, and these in turn update databases in real time. This is in contrast to batch or queued processing of transactions where the transactions are processed at a later time.

An example of an OLTP application is an airline reservation system. When a travel agent sends a request to reserve a seat on a plane, a database is updated accordingly, and a confirmation message is sent back to the agent's terminal. All of the tasks are part of a single transaction, and many agents can perform transactions at the same time. OLTP systems are typically used in environments that support large numbers of users, all accessing the same database, with hundreds and sometimes thousands of transactions taking place each second. The systems are typically based on large enterprise servers that can provide the performance, reliability, and data integrity demanded by these environments.

A transaction may be thought of as a set of actions performed by a transaction processing system wherein the actions together exhibit the properties of Atomicity, Consistency, Isolation, and Durability (ACID). The following definitions are given in *Transaction Processing: Concepts and Techniques*, by Jim Gray and Andreas Reuter, Morgan Kaufmann Publishers, Inc., 1993, p. 6:

Atomicity. A transaction's changes to the state are atomic; either all happen or none happen. These changes include database changes, messages, and actions on transducers.

Consistency. A transaction is a correct transformation of the state. The actions taken as a group do not violate any of the integrity constraints associated with the state. This requires that the transaction be a correct program.

Isolation. Even though transactions execute concurrently, it appears to each transaction, T, that other transactions execute either before T or after T, but not both.

Durability. Once a transaction completes successfully, (commits), the state of the data is changed to reflect the successful completion of the transaction, and the state of the data will survive system failures.

To maintain the properties identified above, at the beginning of processing a transaction, a transaction processing application program typically invokes some form of begin-transaction function to indicate that processing of a transaction has begun. This operation is typically logged to an audit file to demarcate the operations associated with the particular transaction. Following the begin-transaction function, the other functions associated with the application-defined transaction are performed and are also logged to an audit file. If all operations associated with a transaction complete successfully, a commit function is invoked to make permanent any state changes that have occurred as a result of the transaction. The commit operation is logged to the audit file to indicate that all operations have completed successfully. If an error occurs during processing of the transaction and a commit operation is not performed, a rollback function is invoked to undo the effects of the operations performed to that point in processing the transaction.

Distributed Transaction Processing (DTP) is a form of on-line transaction processing that allows a single transaction to be performed by multiple application programs that access one or more databases on one or more computers across a network. This type of transaction, in which multiple application programs cooperate, is called a distributed transaction. Using DTP, for example, related databases at regional and branch locations can be synchronized. DTP also facilitates transaction processing across multiple enterprises. For example, DTP can be used to coordinate the computers of manufactures and suppliers, or to coordinate the computers of enterprises in related industries, such as the travel agency, airline, car rental, and hotel industries.

Transaction processing in a distributed environment can be either non-global or global. In a non-global transaction, the same work takes place as in a traditional transaction, but the work is distributed in a client/server manner. For example, a travel agent may request an airline reservation via a client application program that has a graphical user interface. The client application program communicates with a server application program that manages the reservation database. The server application program updates the database, commits or aborts its own work, and returns information to the client application program, which notifies the travel agent.

A global transaction consists of multiple, coordinated database updates, possibly occurring on different computers. Global transactions are used when it is important that all databases are synchronized so that either all updates are made or none are made. Continuing with the previous example, the travel agent may also need to reserve a rental car and hotel room. The customer who is traveling wants to make sure that all reservations are coordinated; if a flight is unavailable, the hotel and car reservations are not needed. For the purpose of illustrating a global transaction, the airline, car, and hotel databases are on different transaction processing systems.

The global transaction begins when the travel agent requests the reservation from a workstation client application program with a graphical user interface. The client program contacts three server application programs on different transaction processing systems. One server program books a flight, another reserves a car, and the third makes a hotel reservation. Each of the server application programs updates its respective database. The transactions processed by each of the server application programs may be referred to as subordinate transactions of the global transaction. A global transaction manager coordinates the updates to the three databases, and a subordinate transaction manager on each of the individual transaction processing systems coordinates locally with the server application programs. The server application programs return information to the client application program.

A major advantage of global transaction processing is that tasks that were once processed individually are processed as a group, the group of tasks being the global transaction. The database updates are made on an all-or-nothing basis. For example, if an airline seat is not available, the hotel and car reservations are not made. Thus, with a global transaction, tasks that were once performed independently may be coordinated and automated.

As with non-global transactions, global transactions must possess the ACID properties. In order to preserve the ACID properties for a global transaction, the commit processing is modified to a two-phase commit procedure. Under a two-phase commit, a global transaction manager first requests that each of the subordinate transaction managers prepare to commit their updates to the respective databases. If all the local transaction managers respond that they are prepared to commit, the global transaction manager sends a commit request to the local transaction managers. Thus, the two parts of the two-phase commit process are (i) prepare to commit the database updates, and (ii) commit the database updates. If any one of the transaction managers is unable to prepare to commit, the entire global transaction is aborted and each transaction manager performs a rollback function to undo the processing that may have occurred up to that point. In short, the two-phase commit process ensures that multiple databases participating in a single global transaction are synchronized—either all database updates requested by the global transaction are made or, in the event of system or component failure, none are made. Two-phase commit guarantees global data integrity and preserves the ACID properties in a DTP environment.

An industry consortium of users and vendors, known as X/Open™, has developed a model architecture for DTP, referred to as the X/Open Distributed Transaction Processing model. The X/Open DTP model is a software architecture that allows multiple application programs to share resources provided by multiple resource managers, and allows their work to be coordinated into global transactions. The X/Open DTP model comprises a number of components, application programming interfaces, and communications interfaces.

FIG. 1 illustrates a client system 10 and a server system 12 both constructed in accordance with the X/Open DTP model architecture. Referring to the client system 10 as an illustrative example, the components of the X/Open DTP model include an application program (AP) 14, one or more resource managers (RMs) 16, a Transaction Manager (TM) 18, and a Communications Resource Manager (CRM) 20.

An Application Program (AP), such as client application program 14, is a user-defined software component that defines global transaction boundaries and specifies actions that constitute global transactions. It also provides access to one or more resources that are required by a transaction. In a global transaction, two or more APs perform their individual functions which, when combined, make up the global transaction. One of the APs will be the transaction coordinator, that is, the AP that starts and finishes the global transaction. The other APs will be subordinate.

A Resource Manager (RM) 16 provides access to a resource for the AP 14. The X/Open DTP model permits multiple resource managers. Database management systems and file access systems are examples of system software components that act as RMs.

The APs begin and end transactions under the control of the Transaction Manager (TM) 18. The TM 18 is a system software component that assigns transaction identifiers to global transactions, monitors their progress, coordinates their completion, and coordinates failure recovery. The TM enforces the transaction property of atomicity. In a global transaction, the TM adheres to the two-phase commit transaction processing protocol.

The CRM 20 controls communication between the AP 14 and other APs (e.g., AP 40) that are participating in global transactions, as well as between the TM 18 and TMs on separate data processing systems (e.g., the TM of system 12).

The X/Open DTP model provides a number of standard application programming interfaces that enable application programs to interact with system components to conduct global transactions. These application programming interfaces include one or more AP-RM interfaces 22, an AP-TM interface 24, an AP-CRM interface 26, an RM-TM interface 28, and a TM-CRM interface 30.

The AP-RM interfaces 22 provide the AP 14 with access to resources (such as databases) through their respective RMs 16. These interfaces are not specifically defined by the X/Open DTP model, as a number of different resources can exist on a system. Examples of AP-RM interfaces include the Structured Query Language (SQL) and the Indexed Sequential Access Method (ISAM).

The AP-TM interface 24 is provided by the TM 18 to define global transaction boundaries. The AP-TM interface is also referenced as the TX interface. Further information on the TX interface is available in Distributed Transaction Processing: The TX (Transaction Demarcation) Specification, X/Open Company Limited, U.K., (1992). The TX interface is described in somewhat greater detail below.

The AP-CRM 26 interfaces are provided by the CRM 20 to the AP 14. The X/Open DTP model supports the following three AP-CRM interfaces: the TXRPC interface, the XATMI interface, and the CPI-C interface. Each of these interfaces can be used to enable communication between APs that utilize the same interface. Although the XATMI interface is discussed below in somewhat greater detail, further information on the XATMI interface is available in Distributed Transaction Processing: The XATMI Specification, X/Open Company Limited, U.K., (1993)(hereinafter "the XATMI Specification"), which is incorporated herein by reference in its entirety.

The TM-RM interface 28 is used for purposes of transaction control (preparing, committing, or rolling-back). The TM-RM interface 28 is described further in XA Interface, Distributed Transaction Processing: The TX (Transaction Demarcation) Specification, X/Open Company Limited, U.K. (1992). The TM-CRM interface 29 is described further in X/Open Preliminary Specification—Distributed Transaction Processing: The XA+ Specification, X/Open Company Limited, U.K. (1993).

In addition to the foregoing application programming interfaces, systems that implement the X/Open DTP model can communicate with each other using an industry standard communications protocol know as Open Systems Interconnection (OSI) Transaction Processing (TP) (ISO/IEC 10026) ("the OSI TP Standard"), all parts of which are hereby incorporated by reference in their entireties. The OSI TP Standard defines a machine independent protocol that supports communications between computers in a transaction processing system. An industry standard CRM-OSI TP programming interface, called XAP-TP, provides an interface between a CRM 20 and an OSI TP protocol machine 34 that conforms to the OSI TP Standard. ISO/IEC 10026-3, Information Technology—Open Systems Interconnection—Distributed Transaction Processing—Part 3: Protocol Specification ("the OSI TP Protocol Specification") defines the state transitions and protocols that a conformant OSI TP protocol machine must generate in processing OSI TP service requests in accordance with the OSI TP Standard. The XAP-TP programming interface is specified in X/Open ACSE/Presentation: Transaction Processing API (XAP-TP) CAE specification ("the XAP-TP Specification"). The XAP-TP Specification defines the interface, including functions, parameters, and errors, that controls the use of a conformant OSI-TP protocol machine. An implementation of lower layer communication protocols 36 handles the low-level communication chores needed to send information between systems 10 and 12 via a network 38. These lower layer protocols can, for example, be OSI or TCP/IP. The X/Open DTP model does not define an interface to these lower layers.

FIG. 2 is a block diagram illustrating the process structure of a prior art implementation of the XAP-TP and OSI TP components 32, 34 of the system of FIG. 1. The XAP TP component 32' of this implementation operates in accordance with the XAP-TP Specification, and comprises an XAP-TP REQ component 42 for handling calls from the CRM 20 to the OSI TP protocol machine 34' and an XAP-TP RCV component 43 for handling incoming requests received from a peer node (not shown). The OSI TP protocol machine 34', which conforms to the OSI TP Protocol Specification, comprises an HLS FD component 44, with an associated queue 45, a Multiple Association Control Facility (MACF) protocol machine 46, a Channel Protocol Machine 47, a Single Association Control Facility (SACF) protocol machine 48, and a Commitment, Concurrency and Recovery (CCR) component 49.

The CRM calls OSI TP services using the XAP-TP interface. Calls to OSI TP services are passed through the XAP-TP REQ component 42. Data received from a peer node passes through the OSI TP protocol machine 34' and is placed on a queue in the XAP-TP RCV component 43. The CRM periodically polls the XAP-TP RCV component 43 to retrieve data from the queue.

The HLS FD component 44 is a high level scheduler that implements a queuing mechanism. Any requests issued to the OSI TP protocol machine 34' by the CRM 20, and any data and/or requests received from a peer node via the OSI TP protocol machine 34' are placed on the queue 45 of the HLS FD 44.

As specified in the OSI TP Protocol Specification, operation of the OSI TP protocol machine 34' is controlled by two lower level protocol machines, the Multiple Association Control Facility (MACF) protocol machine 46, and the Single Association Control Facility (SACF) protocol machine 49. The MACF protocol machine 46 maps OSI TP services onto other functional capabilities to control and manage the establishment, commitment and recovery of transactions. The SACF protocol machine 49 maintains consistent behavior on each association. It consists of procedures for dialogue establishment and for managing an association while not in a dialogue, as well as for passing service requests through to the lower layer protocols 36. Operation of the MACF protocol machine 46 is specified in the OSI TP Protocol Specification in the form of a MACF state table that defines "events" for each available OSI TP service. For each event, the MACF state table specifies the actions to be performed by the protocol machine depending upon its current state, and if a transition to another state is to occur, the state table specifies that next state. Similarly, operation of the SACF protocol machine 49 is specified in the OSI TP Protocol Specification in the form of a SACF state table. The structure of this table is similar to the MACF state table in that actions and state transitions are specified for each SACF operation. Additional details of the operation of standard MACF and SACF protocol machines are provided in the OSI TP Standard.

The CPM (channel protocol machine) includes the necessary provisions to establish and terminate channel associations used during recovery. The CCR provides support for commitment, rollback and recovery functions when required. Additional details of the operation of the CPM and CCR components of a standard OSI TP protocol machine are also provided in the OSI TP Standard.

As the preferred embodiment of the present invention relates particularly to distributed transaction processing systems in which the CRM component implements the XATMI AP-CRM interface, further details of the XATMI interface follow.

The XATMI interface relies principally on the following API requests supported by the TX interface:

tx_begin()—a demarcation function that indicates that subsequent work performed by the calling AP is in support of a global transaction;

tx_commit()—a demarcation function that commits all work done on behalf of the current global transaction; and tx_rollback()—a demarcation function that rolls back all work done on behalf of the current global transaction. Further details of the TX interface can be found in Distributed Transaction Processing: The TX (Transaction Demarcation) Specification, X/Open Company Limited, U.K., (1992).

The XATMI API provides a set of function calls, collectively referred to as the tp*() function calls, that can be called to perform various functions. Table 1 is a list of these functions, callable from any C language application program:

TABLE 1

Service Requests (Function Calls) of the XATMI API.

| Name | Description |
|---|---|
| | Typed Buffer Functions |
| tpalloc() | Allocate a typed buffer. |
| tpfree() | Free a typed buffer. |
| tprealloc() | Change the size of a typed buffer. |
| tptypes() | Determine information about a typed buffer. |
| | Functions for Writing Service Routines |
| tpservice() | Template for service routines. |
| tpreturn() | Return from a service routine. |

TABLE 1-continued

Service Requests (Function Calls) of the XATMI API.

| Name | Description |
|---|---|
| | Functions for Dynamically Advertising Service Names |
| tpadvertise() | Advertise a service name. |
| tpunadvertise() | Unadvertise a service name. |
| | Functions for Request/Response Services |
| tpacall() | Send a service request. |
| tpcall() | Send a service request and synchronously await its reply. |
| tpcancel() | Cancel a call descriptor for an outstanding reply. |
| tpgetrply() | Get a reply from a previous service request. |
| | Functions for Conversational Services |
| tpconnect() | Establish a conversational service connection. |
| tpdiscon() | Terminate a conversational service connection abortively. |
| tprecv() | Receive a message in a conversational connection. |
| tpsend() | Send a message in a conversational connection. |

Each of the foregoing XATMI API requests has a formal syntax that specifies the format and arguments of each request. The formal syntax for each request is specified in the XATMI Specification.

The XATMI interface supports typed buffers through the typed buffer functions listed above. A typed buffer contains data and has associated with it a type and possibly a subtype, that indicate the meaning or interpretation of the data. An AP calls tpalloc() to allocate a typed buffer of a specified type and subtype, can call tprealloc() to increase its size, and must eventually call tpfree() to dispose of it. A receiver of a typed buffer can call tptypes() to determine the type and subtype of a buffer as well as its size.

Generally, there are two types of services supported by the XATMI interface—request/response services and conversational services. In the request/response service paradigm, requests can be issued to services in two ways: synchronously or asynchronously. The tpcall() function sends a request to a specified service, and returns any response in an application-defined typed buffer. The call to tpcall() returns after any expected response arrives. The tpacall() function also sends a request to a specified service, but it returns without waiting for the service's response, thereby letting the requester do additional work while the service routine processes its request. The tpgetrply() function waits to receive a service reply corresponding to a specified request, and returns the response in an application-defined typed buffer. A requester not wanting to receive a reply to a particular request can use the tpcancel() function, which informs the CRM that any response should be silently discarded.

In the conversational service paradigm, a requester invokes a service routine and converses with it in an application-defined manner. Conversational communication with a service is initiated by calling the tpconnect() function. The service name and application data can be passed to the service as parameters of the call. A descriptor is returned that the requester subsequently uses to refer to the newly established connection. tpsend() and tprecv() are used by APs to exchange data over an open connection. Normally, a connection is terminated by the CRM after the service returns by calling tpreturn(). If, however, a requester wishes to terminate a connection prematurely, the tpdiscon() function is used.

The functions tpservice() and tpreturn() are used to facilitate the writing of service routines in server application programs. A service routine is invoked from implementation-specific dispatching code contained within a server. Handling of the communication path is independent of the service and is the responsibility of the CRM. tpservice() is the template for writing service routines, and can be used both for request/response services, as well as for conversational services. tpreturn() is used to send a service's reply message. If an AP is waiting for a reply as a result of either a tpcall(), tpgetrply(), or tprecv(), then a successful call to tpreturn() by the service will place the reply in the receiving AP's buffer.

When a requesting AP uses either tpacall(), tpcall(), or tpconnect() to interact with a particular service, it passes a service name identifier to the service AP as a parameter to the call. When servers are started, they advertise the set of services that they offer by name, in an application-specific manner. tpadvertise() is used by a server to advertise a new service that it offers. The function has two parameters: the service name identifier and the actual C language routine that the server must invoke whenever a requesting AP requests that service by name. A server can use the tpunadvertise() function to unadvertise a service.

Application programs (APs) make calls to the TM and CRM components of a distributed transaction processing system, via the respective TX and XATMI interfaces, to initiate and execute global transactions. In general, a global transaction is processed as follows. The client application program executing on one system uses a tx-begin() primitive of the TX interface to start a global transaction. Thereafter, the client application program uses various XATMI primitives, such as tpcall(), tpacall(), and tpconnect(), to call various services provided by one or more server application programs executing on the same or other systems. The server application programs may use local RMs to update databases in response to the calls made by the client application program. When the work is done, the client application program will use the tx_commit() primitive of the TX interface to initiate the two-phase commit process and to coordinate that process among the client's TM and the TMs of the various service application programs involved in the transaction. Specifically, the initiating TM (the one that received the tx_begin() )will communicate with all the other TMs via OSI TP to request approval to commit and update the databases. If all agree, the database will be updated. If any do not agree, then a rollback function is performed to return all databases to the state they were in before the transaction began. If the client application program and/or any of the server application programs reside on different computer systems, the two systems will communicate with each other using their respective CRMs, which are built on a foundation of OSI TP. As mentioned above, OSI TP provides services and protocols that assist the two-phase commit process and communication between systems. The OSI TP implementations on each system in turn operate across lower layer services and protocols that can, for example, be OSI or TCP/IP.

Further according to the X/Open DTP model, the primitives (i.e., function calls) of the XATMI API are mapped to the services of the OSI TP protocol through an abstraction layer referred to as the XATMI Application Service Element (XATMI ASE). The XATMI-ASE defines how the primitives in the XATMI interface (e.g., tpcall, tpacall, tpsend, etc.) are mapped to the services of the OSI TP protocol.

First, each of the primitives of the XATMI interface described above is mapped to a service primitive of the XATMI ASE. Table 2 summarizes the set of XATMI-ASE services used by the relevant XATMI interface primitives.

TABLE 2

XATMI-ASE Services Used By XATMI Interface Primitives

| XATMI Interface Primitives | Client Role | Server Role | XATMI-ASE Services |
|---|---|---|---|
| tpcall() | ● | | XATMI-CALL req (XATMI-REPLY ind or XATMI-FAILURE ind) |
| tpacall() | ● | | XATMI-CALL req |
| tpgetrply() | ● | | XATMI-REPLY ind or XATMI-FAILURE ind |
| tpcancel() | ● | | XATMI-CANCEL req |
| tpservice() | | ● | XATMI-CALL ind or XATMI-CONNECT ind |
| tpreturn() | | ● | XATMI-REPLY req or XATMI-FAILURE req |
| tpconnect() | ● | | XATMI-CONNECT req |
| tpdiscon() | ● | | XATMI-DISCON req |
| tpsend() | ● | ● | XATMI-DATA req (XATMI-REPLY ind or XATMI-DISCON ind or XATMI-FAILURE ind) |
| tprecv() | ● | ● | XATMI-DATA ind and (XATMI-REPLY ind or XATMI-DISCON ind or XATMI-FAILURE ind) |

Similarly, the primitives of the TX interface are mapped to XATMI-ASE services, as shown in Table 3.

TABLE 3

XATMI-ASE Services Used By TX Interface Primitives

| TX Interface Primitives | XATMI-ASE Services |
|---|---|
| tx_commit() | XATMI-PREPARE req<br>XATMI-READY ind<br>XATMI-COMMIT req<br>XATMI-COMMIT ind<br>XATMI-DONE req<br>XATMI-COMPLETE ind |
| tx_rollback() | XATMI-ROLLBACK req<br>XATMI-DONE req<br>XATMI-COMPLETE ind |

As further specified in the XATMI Specification, each of the services of the XATMI-ASE maps to one, or a combination of, OSI TP services. Both client role mappings and server role mappings are provided. For example, the XATMI-ASE services, XATMI-CALL req and XATMI-REPLY ind, map to multiple OSI TP services as follows:

| XATMI-ASE Services (Client) | Map No. | OSI TP Services |
|---|---|---|
| XATMI-CALL req | 1 | TP-BEGIN-DIALOGUE req<br>[TP-DEFER-END-DIALOGUE req]<br>TP-DATA req<br>TP-GRANT-CONTROL req |
| | 2 | TP-BEGIN-DIALOGUE req<br>TP-DATA req<br>TP-END-DIALOGUE req |
| XATMI-REPLY ind | 3 | TP-DATA ind<br>TP-GRANT-CONTROL ind |
| XATMI-REPLY ind (cont.) | 4 | TP-DATA ind<br>TP-END-DIALOGUE ind |

Mappings for the other XATMI-ASE service primitives are provided in the XATMI Specification.

The XAP-TP programming interface, described briefly above, provides the interface between the XATMI-ASE service calls issued by a CRM, and the corresponding OSI TP service calls to which they must be mapped in an OSI TP protocol machine. As shown by the foregoing examples, some of the XATMI-ASE service primitives map to a combination of more than one OSI TP service. For example, the XATMI-ASE service primitive, XATMI-CALL req, maps to a sequence of three OSI TP service calls, TP-BEGIN-DIALOGUE req, TP-DATA req, and TP-GRANT-CONTROL req. Thus, according to the XAP TP Specification and OSI TP Protocol Specification, the XAP-TP interface must be called three successive times in order to execute the XATMI-CALL req service primitive of the XATMI-ASE, i.e., once for each OSI TP service call to which it maps. Moreover, according to the OSI TP Protocol Specification, each of the OSI TP service calls is processed by the OSI TP protocol machine independently—one at a time.

FIG. 3 illustrates the manner in which a CRM and a conformant OSI TP protocol machine operate to execute a function call of the XATMI interface in accordance with the standard OSI TP Protocol Specification. Using the X/Open DTP model system illustrated in FIG. 1 as an example, at step 50, the Application Program 14 on the client node 10 of the distributed transaction processing system issues a tpcall() function call to the CRM 20. The tpcall() function call is mapped in the CRM 20 to the XATMI-CALL req primitive of the XATMI-ASE. As illustrated in Table 2, the XATMI-CALL req primitive of the XATMI-ASE maps to the following sequence of OSI TP service requests: $TP_{13}$ BEGIN_DIALOGE_REQ, TP_DATA_REQ, and TP_GRANT CONTROL_REQ. At step 52, the CRM 20 calls the OSI TP protocol machine 34 through the XAP-TP interface 32, requesting that a TP_BEGIN_DIALOGE_REQ be issued to the server node (i.e., peer) 12. At step 54, the OSI TP protocol machine 34 processes the TP_BEGIN_DIALOGE_REQ request and then returns control to the CRM 20. At step 56, the lower layer protocols send an OSI TP PDU to the peer comprising a TP_BEGIN_DIALOGUE_RI.

Next, at step 58, the CRM 20 calls the OSI TP protocol machine 34 a second time, again using the XAP TP interface 32, to request that a TP_DATA_REQ be issued to the peer 12. At step 60, the OSI TP protocol machine 34 processes the request and returns control to the CRM 20. At step 62, the CRM 20 calls the OSI TP protocol machine 34 a third time via the XAP-TP interface 32, requesting that the OSI TP protocol machine 34 issue a TP_GRANT_CONTROL_REQ to the peer. The OSI TP protocol machine 34 processes the request at step 64. At step 66, the lower layer protocols send another OSI TP PDU to the peer comprising U_ASE_RI and TP_GRANT_CONTROL_RI indications.

As FIG. 3 illustrates, according to the XAP-TP Specification and OSI TP Protocol Specification, the CRM 20 is required to make calls to the OSI TP protocol machine 34, via XAP-TP 32, three separate times in order to perform the services required by the XATMI-CALL req primitive of the XATMI-ASE. Each of these calls enters the OSI TP protocol machine 34 separately. For each call, the OSI TP protocol machine 34 makes the necessary state transitions, and then enters a protocol encoder to encode appropriate OSI-TP PDUs, as described in the OSI TP Protocol Specification. These PDUs are eventually sent to the network 38 via the lower layer protocols 36, as illustrated at steps 56 and 66.

The reason that higher-level services, such as the XATMI-CALL req of the XATMI-ASE, are broken down into more granular service primitives within the OSI TP protocol machine is that, as mentioned above, the standard OSI TP protocol machine, as specified in the OSI TP Protocol Specification, must support multiple AP-CRM programming interfaces—the XATMI interface described above, the TXRPC interface, the CPI-C interface, and others not yet defined. Combinations of the granular service primitives of the OSI TP Protocol Specification are executed, in sequence, as necessary to perform the higher level services of each AP-CRM interface.

In practice, the granular nature of the service primitives of the OSI TP Protocol Specification can result in increased system overhead that adversely affects the performance and throughput of any implementation of the OSI TP Protocol Specification. For example, as the flow diagram of FIG. 3 illustrates, because of the granular nature of the OSI TP Protocol Specification, execution of a single XATMI-ASE service request, such as XATMI-CALL req, requires three separate calls to a standard OSI TP protocol machine via the XAP TP interface. The system must cross the process boundary between the user process (i.e., the software processes executing the functions of the AP, TM, and CRM) and the OSI TP process (i.e., the software processes executing the functions of the OSI TP protocol machine) multiple times. Numerous calls across process boundaries in a software implementation of a system can seriously affect performance of the system.

Some distributed transaction processing systems may only support one of the three available AP-CRM programming interfaces. For example, a system may only support the XATMI interface. Nevertheless, the OSI TP Protocol Specification was designed with sufficient granularity to support many AP-CRM interfaces, and the overhead imposed by that design cannot be avoided with a fully compliant OSI TP protocol machine. Accordingly, there is a need for methods and apparatus for optimizing the operation of an OSI TP based protocol machine for use in a particular AP-CRM interface environment, without affecting the conformance of the system to the OSI TP Protocol Specification. The present invention satisfies this need.

SUMMARY OF THE INVENTION

The present invention is directed to methods and apparatus for optimizing the performance and throughput of a distributed transaction processing system. The methods and apparatus of the present invention are particularly advantageous in distributed transaction processing systems that support only a single AP-CRM programming interface, such as, for example, the XATMI programming interface. According to the present invention, multiple OSI TP service requests to which a particular AP-CRM interface call is mapped, and which are normally processed as individual events by an OSI TP protocol machine that conforms to the OSI TP Protocol Specification, are concatenated and processed by a modified OSI TP protocol machine as a single, atomic event. In this manner, processing of OSI TP service requests is optimized for the particular AP-CRM interface that the distributed transaction processing system supports. Further according to the present invention, a new CRM-OSI TP programming interface is provided in place of the standard XAP-TP programming interface. The new interface maps each service of the particular AP-CRM interface to a respective, single service request of the new interface. Each service request of the new interface represents a concatenation of the OSI TP services to which the corresponding service of the particular AP-CRM is normally mapped.

A preferred embodiment of the present invention is implemented in a distributed transaction processing system that supports the XATMI AP-CRM programming interface. In accordance with this embodiment, the multiple OSI TP service requests to which a given service request of the XATMI ASE is mapped, and which are normally processed as individual events in an OSI TP protocol machine that conforms to the OSI TP Protocol Specification, are concatenated and processed by a modified OSI TP protocol machine as a single, atomic event. The modified OSI TP protocol machine comprises a modified MACF protocol machine that operates in accordance with a modified MACF state table that defines new event primitives and associated actions to support the processing of concatenated OSI TP services as single, atomic events. The modified OSI TP protocol machine also comprises a modified SACF protocol machine that operates in accordance with a modified SACF state table that defines new service primitives that correspond to the new events defined in the modified MACF state table. Further according to the present invention, the modified OSI TP protocol machine further comprises means for receiving successive OSI TP PDUs from a peer node until all of the PDUs associated with a particular service of the XATMI ASE protocol specification have been received, concatenating the received PDUs associated with that XATMI ASE service, and then passing the concatenated PDUs through the modified OSI TP protocol machine for processing as a single, atomic event.

As support for the processing of concatenated OSI TP services as a single, atomic event in an XATMI ASE environment, the present invention further comprises a CRM-OSI TP programming interface, referred to herein as the HPTPX programming interface (High Performance Transaction Processing for XATMI), which serves as a replacement for the standard XAP TP programming interface. Each service primitive of the XATMI ASE maps to a respective, single service request of the HPTPX interface of the present invention. Each service request of the HPTPX interface represents a concatenation of the OSI TP services to which its respective XATMI ASE service is normally mapped in accordance with the XATMI Specification.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings:

FIG. 6 shows a portion of a modified MACF state table according to a preferred embodiment of the present invention, and provides further details of the operation of the apparatus of FIG. 5;

FIG. 7 shows a portion of a modified SACF state table according to a preferred embodiment of the present invention, and provides still further details of the operation of the apparatus of FIG. 5;

FIGS. 8A–8C comprise a table that provides further details of the operation of the PDU Concatenator component of the apparatus of FIG. 5, in accordance with a preferred embodiment of the present invention.

DETAILED DESCRIPTION OF THE PREFERRED EMBODIMENT

Figure 1:
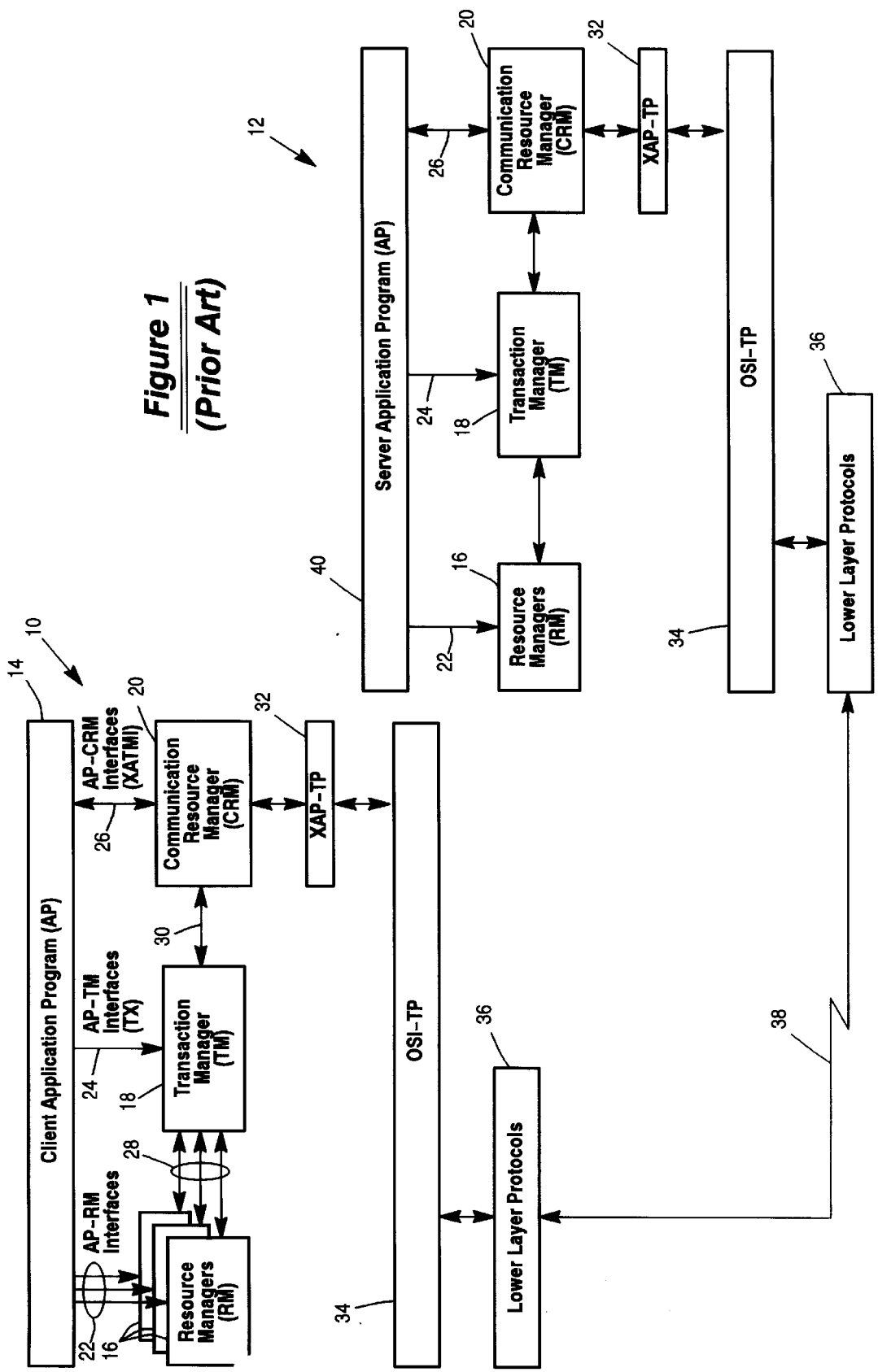
FIG. 1 is a block diagram illustrating the X/Open Distributed Transaction Processing (DTP) model architecture for distributed transaction processing systems.
Figure 2:
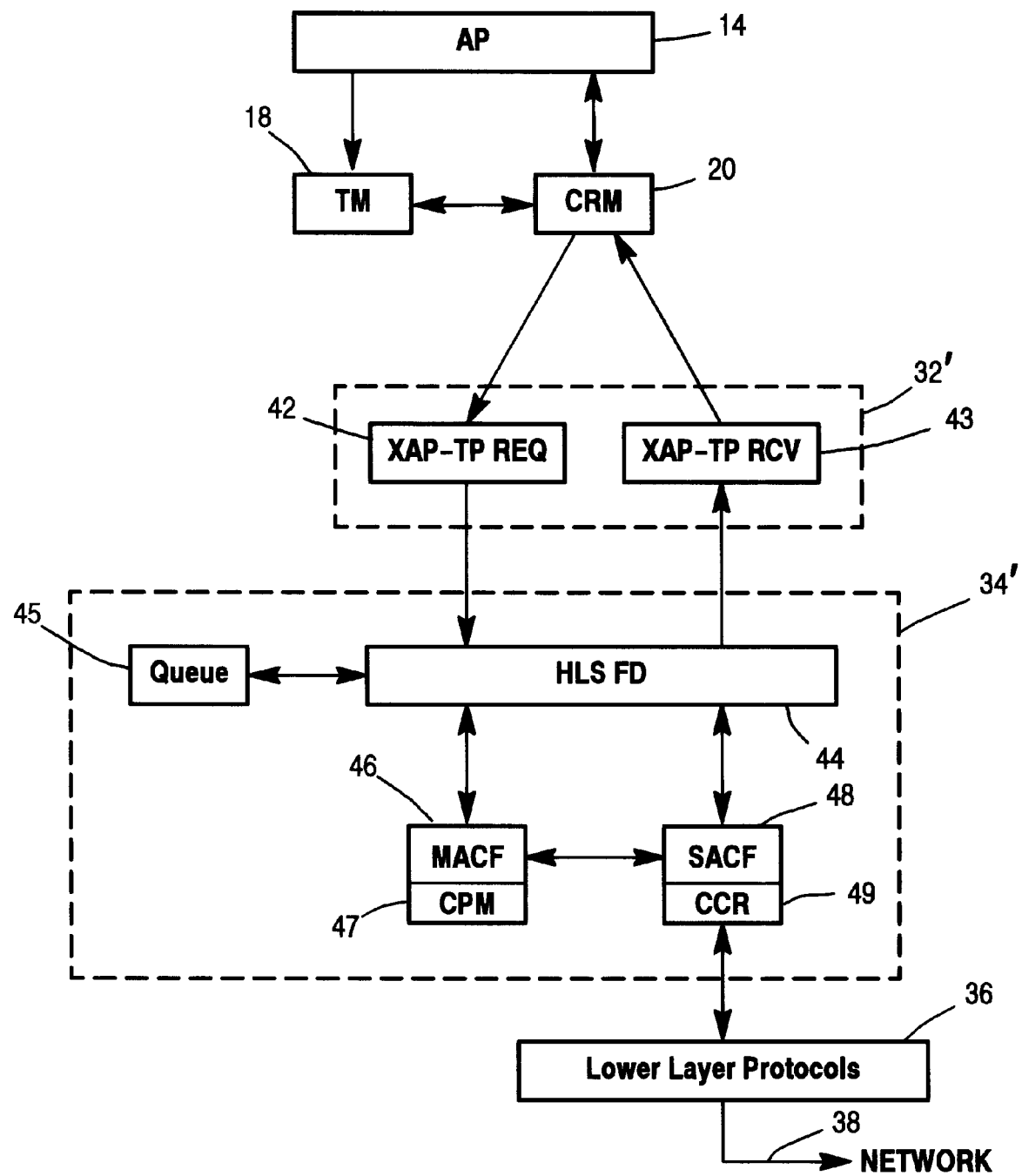
FIG. 2 is a block diagram illustrating the process structure of a prior art implementation of the XAP-TP and OSI TP components of the model architecture of FIG. 1.

The present invention is directed to methods and apparatus for optimizing the performance and throughput of a distributed transaction processing system. The methods and apparatus of the present invention are particularly advantageous in distributed transaction processing systems that support only a single AP-CRM programming interface, such as, for example, the XATMI programming interface. As described hereinafter, the methods and apparatus of the present may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

According to the present invention, multiple OSI TP service requests to which a particular AP-CRM interface call is mapped, and which are normally processed as individual events by an OSI TP protocol machine that conforms to the OSI TP Protocol Specification, are concatenated and processed by a modified OSI TP protocol machine (described hereinafter) as a single, atomic event. In this manner processing of OSI TP service requests is optimized for the particular AP-CRM interface that the distributed transaction processing system supports. Further according to the present invention, a new CRM-OSI TP programming interface is provided in place of the standard XAP-TP programming interface. The new interface maps each service of the particular AP-CRM interface to a respective, single service request of the new interface. Each service request of the new interface represents a concatenation of the OSI TP services to which the corresponding service of the particular AP-CRM is normally mapped.

The embodiment of the present invention described hereinafter is implemented in a distributed transaction processing system that supports the XATMI AP-CRM interface. Specifically, in accordance with this embodiment of the present invention, the multiple OSI TP service requests to which a given service request of the XATM ASE is mapped, and which are normally processed as individual events in an OSI TP protocol machine that conforms to the OSI TP Protocol Specification, are concatenated and processed by a modified OSI TP protocol machine as a single, atomic event. The modified OSI TP protocol machine comprises a modified MACF protocol machine that operates in accordance with a modified MACF state table that defines new event primitives and associated actions to support the processing of concatenated OSI TP services as single, atomic events. The modified OSI TP protocol machine also comprises a modified SACF protocol machine that operates in accordance with a modified SACF state table that defines new service primitives that correspond to the new events defined in the modified MACF state table. Further according to the present invention, the modified OSI TP protocol machine further comprises means for receiving successive OSI TP PDUs from a peer node until all of the PDUs associated with a particular service of the XATMI ASE protocol specification have been received, concatenating the received PDUs associated with that XATMI ASE service, and then passing the concatenated PDUs through the modified OSI TP protocol machine for processing as a single, atomic event.

As support for the processing of concatenated OSI TP services as a single, atomic event in an XATMI ASE environment, the present invention further comprises a CRM-OSI TP programming interface, referred to herein as the HPTPX programming interface (High Performance Transaction Processing for XATMI), which serves as a replacement for the standard XAP TP programming interface. Each service primitive of the XATMI ASE maps to a respective, single service request of the HPTPX interface of the present invention. Each service request of the HPTPX interface represents a concatenation of the OSI TP services to which its respective XATMI ASE service is normally mapped in accordance with the XATMI Specification.

Tables 4 and 5 specify the mappings between the service primitives of the XATMI-ASE and the new service requests of the HPTPX interface of the present invention. Table 4 specifies the mappings for a CRM serving a client role. Table 5 specifies the mappings for a CRM serving a server role. Also listed for each XATMI-ASE/HPTPX service mapping are the individual OSI TP services that the mapping encompasses (these are the OSI TP services to which that XATMI-ASE service is normally mapped as specified in the XATMI-ASE protocol specification). As explained above, when a particular service call is made to the HPTPX interface, the corresponding OSI TP service requests listed in the table (i.e., Table 4 or 5) are concatenated and processed by the modified OSI TP protocol machine of the present invention as a single, atomic event. Thus, each service primitive of the HPTPX interface represents a concatenation of the OSI TP services needed to perform the functions of its corresponding XATMI-ASE primitive. For example, considering the first row of Table 4 (Client Role), the HPTPX-CALLCON-REQ service primitive of the HPTPX interface represents a concatenation of the TP-BEGIN-DIALOGUE req, TP-DATA req, and TP-GRANT-CONTROL req services of OSI TP, the services to which the XATMI-ASE service, XATMI-CALL req, is normally mapped.

TABLE 4

XATMI-ASE to HPTPX Client Role Mappings

| XATMI-ASE Services (Client Role) | Map No. | OSI TP | HPTPX Service Requests |
|---|---|---|---|
| XATMI-CALL req | 1 | TP-BEGIN-DIALOGUE req [TP-DEFER-END-DIALOGUE req] TP-DATA req TP-GRANT-CONTROL req | HPTPX-CALLCON-REQ ase_flags: [TPNOTRAN] |
|  | 2 | TP-BEGIN-DIALOGUE req TP-DATA req TP-END-DIALOGUE req | HPTPX-CALLCON-REQ ase_flags: TPNOTRAN TPNOREPLY |
| XATMI-REPLY ind | 3 | TP-DATA ind TP-GRANT-CONTROL ind | HPTPX-DELIVERIND hptpx_ind: sptype: HPTPX_DATA_IND, CRM_flags: CRM_REPLY |
|  | 4 | TP-DATA ind TP-END-DIALOGUE ind | HPTPX-DELIVERIND hptpx_ind: sptype: HPTPX_DATA_IND, CRM_flags: CRM_CLOSEOPT |
| XATMI-FAILURE ind | 5 | TP-U-ABORT ind | HPTPX-DELIVERIND hptpx_ind: sptype: HPTPX_U_ABORT_IND |
|  | 6 | TP-P-ABORT ind | HPTPX-DELIVERIND hptpx_ind: sptype: HPTPX_P_ABORT_IND |
|  | 7 | TP-BEGIN-DIALOGUE(Reject) cnf | HPTPX-RESPONSE-REQ |
| XATMI-CANCEL req | 8 | TP-U-ABORT req | HPTPX-ABORT-REQ |
| XATMI-CONNECT req | 9 | TP-BEGIN-DIALOGUE req [TP-DEFER-END-DIALOGUE req] TP-DATA req TP-GRANT-CONTROL req | HPTPX-CALLCON-REQ ase_flags: [TPNOTRAN] |
|  | 10 | TP-BEGIN-DIALOGUE req [TP-DEFER-END-DIALOGUE req] TP-DATA req TP-BEGIN-DIALOGUE cnf | HPTPX-CALLCON-REQ ase_flags: [TPNOTRAN] TPSENDONLY |
| XATMI-DISCON req | 11 | TP-U-ABORT req | HPTPX-ABORT-REQ |
| XATMI-DATA req | 12 | TP-DATA req [TP-GRANT-CONTROL req] | HPTPX-DATA-REQ ase_flags: [CRM-REPLY] |
| XATMI-DATA ind | 13 | TP-DATA ind [TP-GRANT-CONTROL ind] | HPTPX-DELIVERIND hptpx_ind: sptype: HPTPX_DATA_IND, [CRM_flags: CRM_REPLY] |
| XATMI-PREPARE req | 14 | TP-PREPARE req | HPTPX-PREPARE-REQ |
| XATMI-READY ind | 15 | TP-READY ind | HPTPX-DELIVERIND sptype: HPTPX_READY_IND |
| XATMI-COMMIT req | 16 | TP-COMMIT req TP-DONE-REQ | HPTPX-COMMIT-REQ |
| XATMI-COMMIT ind | 17 | TP-COMMIT ind | HPTPX-DELIVERIND sptype: HPTPX_COMMIT_IND |
| XATMI-DONE req | 18 | TP-DONE req [HEURISTICS] | HPTPX-DONE-REQ [Heuristic_flag: HPTPX_HEUR_MIX/HPTPX_HEUR_HAZ] |
| XATMI-CANCEL req | 19 | TP-U-ABORT req TP-DONE req | HPTPX-ABORT-REQ (TRANSACTIONAL) |
| XATMI-ROLLBACK req | 20 | TP-ROLLBACK req TP-DONE req | HPTPX-ROLLBACK-REQ |
| XATMI-ROLLBACK ind | 21 | TP-P-ABORT ind | HPTPX-DELIVERIND sptype: HPTPX_P_ABORT_IND, rollback_flag: ROLLBACK |
|  | 22 | TP-U-ABORT ind | HPTPX-DELIVERIND sptype: HPTPX_U_ABORT_IND, rollback_flag: ROLLBACK |
| XATMI-COMPLETE ind | 23 | TP-COMMIT-COMPLETE ind | HPTPX-DELIVERIND sptype: HPTPX_COMMIT_COMPLETE_IND, diagnostic: HPTPX_NO_HEUR |
|  | 24 | TP-ROLLBACK-COMPLETE ind | HPTPX-DELIVERIND sptype: HPTPX_ROLLBACK_COMPLETE_IND, diagnostic: HPTPX_NO_HEUR |
| XATMI-HEURISTIC ind | 25 | TP-COMMIT-COMPLETE ind TP_HEURISTIC ind | HPTPX-DELIVERIND sptype: HPTPX_COMMIT_COMPLETE_IN |

TABLE 4-continued

XATMI-ASE to HPTPX Client Role Mappings

| XATMI-ASE Services (Client Role) | Map No. | OSI TP | HPTPX Service Requests |
|---|---|---|---|
| | 25 | TP-ROLLBACK-COMPLETE ind<br>TP_HEURISTIC ind | D, diagnostic: HPTPX_HEUR_MIX or HPTPX_HEUR_HAZ<br>HPTPX-DELIVERIND<br>sptype:<br>HPTPX_ROLLBACK_COMPLETE_IND, diagnostic:<br>HPTPX_HEUR_MIX or HPTPX_HEUR_HAZ |

TABLE 5

XATMI-ASE to HPTPX Server Role Mappings

| XATMI-ASE Services (Server Role) | Map No. | OSI TP Services | HPTPX Service Requests |
|---|---|---|---|
| XATMI-CALL ind | 26 | TP-BEGIN-DIALOGUE ind<br>[TP-DEFER-END-DIALOGUE ind]<br>TP-DATA ind<br>TP-GRANT-CONTROL ind | HPTPX-DIALOGUE-IND<br>ase_flags: [TPNOTRAN] |
| | 27 | TP-BEGIN-DIALOGUE ind<br>TP-DATA ind<br>TP-END-DIALOGUE ind | HPTPX-DIALOGUE-IND<br>ase_flags: TPNOTPAN TPNOREPLY |
| | 28 | TP-BEGIN-DIALOGUE ind<br>TP-BEGIN-DIALOGUE rsp | HPTPX-DIALOGUE-IND<br>ase_flags: TPSENDONLY |
| XATMI-CONNECT ind | 29 | TP-BEGIN-DIALOGUE ind<br>[TP-DEFER-END-DIALOGUE ind]<br>TP-DATA ind<br>TP-GRANT-CONTROL ind | HPTPX-DIALOGUE-IND<br>ase_flags: [TPNOTRAN] |
| | 30 | TP-BEGIN-DIALOGUE ind<br>[TP-DEFER-END-DIALOGUE ind]<br>TP-DATA ind<br>TP-BEGIN-DIALOGUE rsp | HPTPX-DIALOGUE-IND<br>ase_flags: [TPNOTRAN] TPSENDONLY |
| | 31 | TP-BEGIN-DIALOGUE ind<br>TP-BEGIN-DIALOGUE rsp | HPTPX-DIALOGUE-IND<br>ase_flags: TPSENDONLY |
| XATMI-REPLY req | 32 | TP-DATA req<br>TP-GRANT-CONTROL req | HPTPX-DATA-REQ<br>CRM_flags: CRM_REPLY |
| | 33 | TP-DATA req<br>TP-END-DIALOGUE req | HPTPX-DATA-REQ<br>CRM_flags: CRM_CLOSEOPT |
| XATMI-FAILURE req | 34 | TP-U-ABORT req | HPTPX-ABORT-REQ |
| XATMI-CANCEL ind | 35 | TP-U-ABORT ind | HPTPX-DELIVERIND<br>hptpx_ind: sptype:<br>HPTPX_U_ABORT_IND |
| | 36 | TP-P-ABORT ind | HPTPX-DELIVERIND<br>hptpx_ind: sptype:<br>HPTPX_P_ABORT_IND |
| XATMI-DISCON ind | 37 | TP-U-ABORT ind | HPTPX-DELIVERIND<br>hptpx_ind: sptype:<br>HPTPX_U_ABORT_IND |
| | 38 | TP-P-ABORT ind | HPTPX-DELIVERIND<br>hptpx_ind: sptype:<br>HPTPX_P_ABORT_IND |
| XATMI-DATA ind | 39 | TP-DATA ind<br>[TP-GRANT-CONTROL ind] | HPTPX-DELIVERIND<br>hptpx_ind: sptype:<br>HPTPX_DATA_IND, [CRM_flags: CRM_REPLY]. |
| XATMI-DATA req | 40 | TP-DATA req<br>[TP-GRANT-CONTROL req] | HPTPX-DATA-REQ<br>ase_flags: [CRM-REPLY] |
| XATMI-PREPARE ind | 41 | TP-PREPARE ind | HPTPX-DELIVERIND<br>hptpx_ind: sptype:<br>HPTPX_PREPARE_IND |
| XATMI-COMMIT req | 42 | TP-COMMIT req | HPTPX-COMMIT-REQ |
| XATMI-COMMIT ind | 43 | TP-COMMIT ind | HPTPX-DELIVERIND<br>sptype: HPTPX_COMMIT_IND |
| XATMI-DONE req | 44 | TP-DONE req<br>[HEURISTICS] | HPTPX-DONE-REQ<br>[Heuristic_flag: |

TABLE 5-continued

XATMI-ASE to HPTPX Server Role Mappings

| XATMI-ASE Services (Server Role) | Map No. | OSI TP Services | HPTPX Service Requests |
|---|---|---|---|
| | | | HPTPX_HEUR_MIX/HPTPX_HEUR_HAZ] |
| | 45 | TP-DONE req | HPTPX-ABORT-REQ (TRANSACTIONAL) |
| | | TP-U-ABORT req | |
| | | TP-DONE req | |
| XATMI-ROLLBACK req | 46 | TP-U-ABORT req | HPTPX-ABORT-REQ |
| XATMI-ROLLBACK ind | 47 | TP-ROLLBACK ind | HPTPX-DELIVERIND sptype: HPTPX_ROLLBACK_IND |
| | 48 | TP-P-ABORT ind | HPTPX-DELIVERIND sptype: HPTPX_P_ABORT_IND, rollback_flag: ROLLBACK |
| XATMI-COMPLETE ind | 49 | TP-COMMIT-COMPLETE ind | HPTPX-DELIVERIND sptype: HPTPX_COMMIT_COMPLETE_IND, diagnostic: HPTPX_NO_HEUR |
| | 50 | TP-ROLLBACK-COMPLETE ind | HPTPX-DELIVERIND sptype: HPTPX_ROLLBACK_COMPLETE_IND, diagnostic: HPTPX_NO_HEUR |

Figure 3:
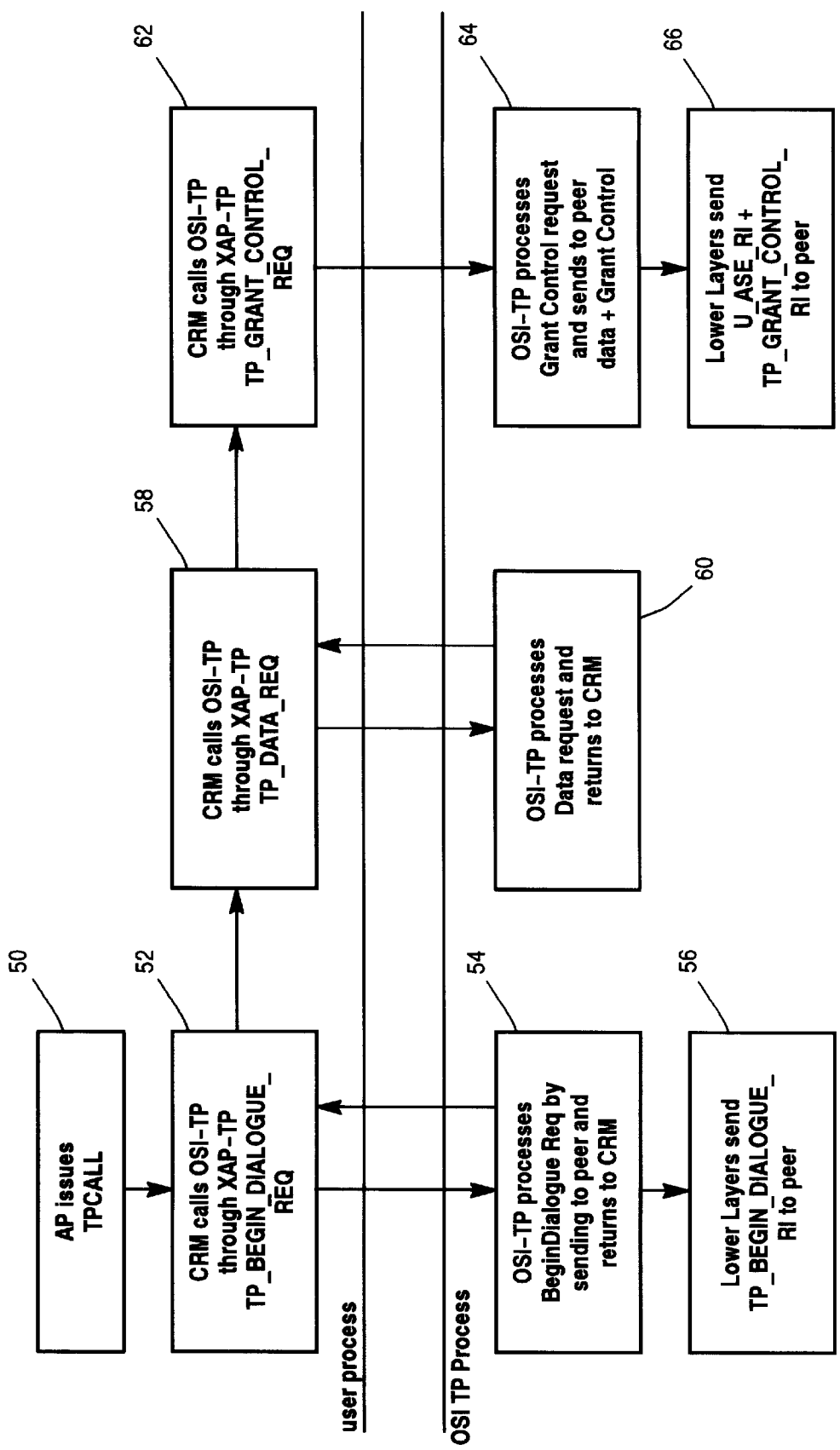
FIG. 3 is a flow diagram illustrating one example of a prior art method of processing an XATMI service request in accordance with the OSI TP Protocol Specification.
Figure 4:
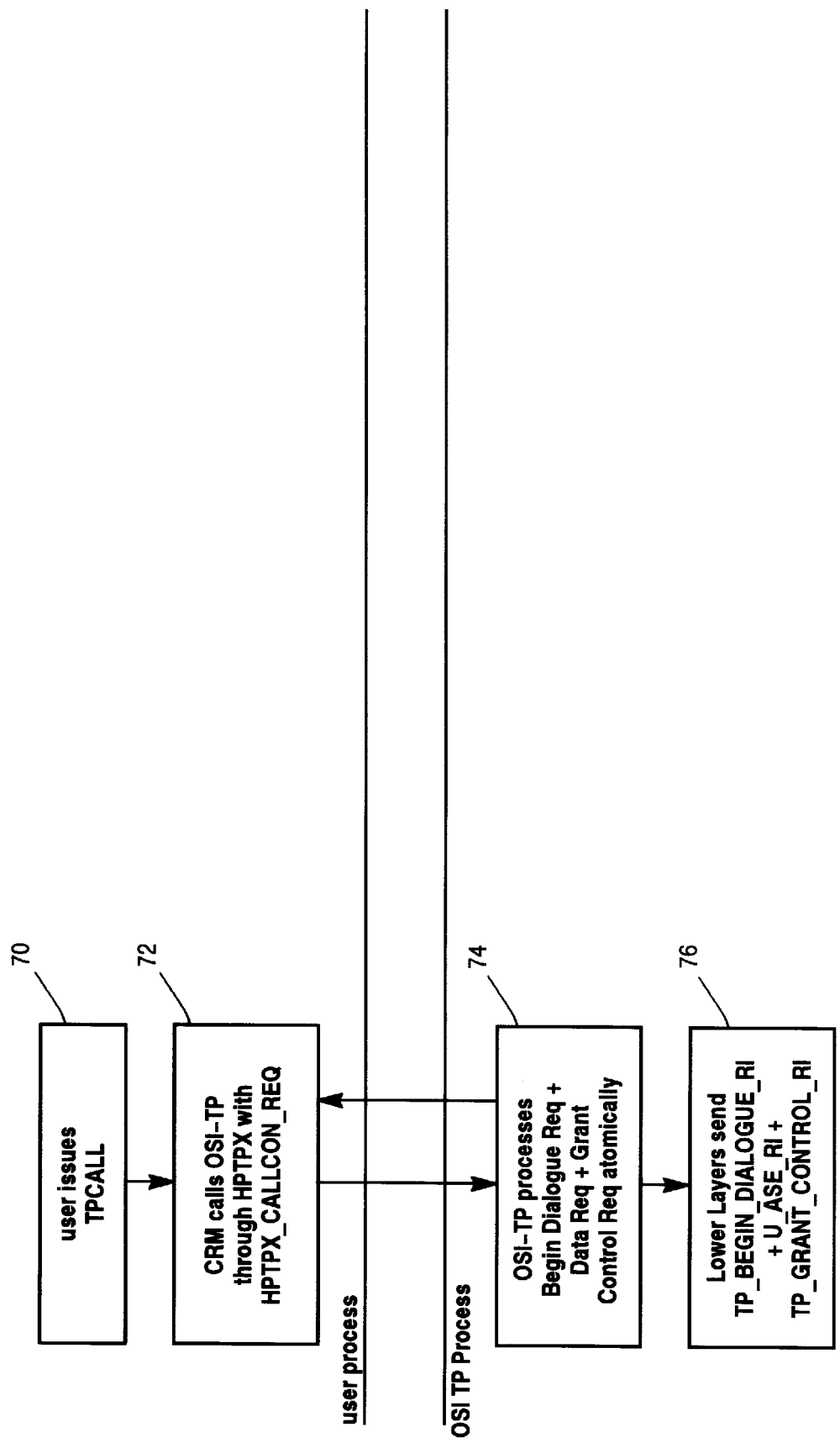
FIG. 4 is a flow diagram illustrating one example of the processing of an XATMI service request in accordance with a preferred embodiment of a method of the present invention.

FIG. 4 provides an example that illustrates the method of the present invention. At step 70, an Application Program on a client node issues a tpcall() function call to its CRM. The tpcall() function call is mapped in the CRM to the XATMI-CALL req primitive of the XATMI-ASE. As illustrated in Table 4, in accordance with the present invention, the XATMI-CALL req primitive of the XATMI-ASE maps to an HPTPX-CALLCON-REQ of the HPTPX interface of the present invention. The HPTPX-CALLCON-REQ represents a concatenation of the OSI TP service requests to which the XATMI-CALL req normally maps, i.e., TP_BEGIN_DIALOGUE_REQ, TP_DATA_REQ, and TP_GRANT CONTROL_REQ. At step 72, the CRM calls a modified OSI TP protocol machine (described hereinafter in greater detail) through the HPTPX interface of the present invention, requesting that the HPTPX-CALLCON-REQ be processed. According to the present invention, the modified OSI TP protocol machine then processes the concatenated TP_BEGIN_DIALOGUE_REQ, TP_DATA_REQ, and TP_GRANT CONTROL_REQ requests as a single, atomic event. This generates the same string of OSI TP PDUs that are produced in the traditional manner illustrated in FIG. 3—the difference being that in the method of the present invention, these PDUs are produced as the output of a single, atomic event. The PDUs are then concatenated in accordance with the OSI TP concatenation rules specified in the OSI TP Protocol Specification, and sent via lower layer protocols to the peer, as shown at step 76.

As FIG. 4 illustrates, the method of the present invention reduces context switching between the user process and the modified OSI TP process. As compared to the prior art example of FIG. 3, the user/OSI TP process boundary is crossed only once, resulting in improved performance and throughput over the prior art method. The modified OSI TP protocol and accompanying HPTPX interface are optimized for the XATMI-ASE interface. Moreover, because the processing of concatenated OSI TP services in accordance with the method of the present invention produces the same string of OSI TP PDUs as would be produced in the prior art method, the method and apparatus of the present invention achieve the improved performance and throughput while still conforming to the protocol of the OSI TP Standard.

In greater detail, the HPTPX interface consists of a series of function entry points. When a CRM wants to send a request to the modified OSI TP protocol machine of the present invention (described hereinafter), it calls one of the HPTPX functions listed in Tables 4 and 5 having the suffix "REQ." Conversely, when the modified OSI TP protocol machine needs to deliver an indication to the CRM, it calls one of the HPTPX functions listed in Tables 4 and 5 having the suffix "IND". All abnormal termination is handled by the XATMI state tables. If a process fails during the commitment phase, any abort conditions are absorbed by the CRM.

The following is a more detailed description of each service primitive (i.e., function call, request, etc.) of the CRM-OSI TP programming interface, HPTPX, of the present invention.

Further details of the syntax and semantics of each HPTPX function call are provided in Appendix C attached hereto.

HPTPX-CALLCON-REQ

This primitive is used to send a message to a particular service. It returns a tp_id field that is used in subsequent calls to identify the branch.

HPTPX-DATA-REQ

This primitive is used to send an XATMI-DATA-REQ. Upon successful completion, a value of 0 is returned. Otherwise a −1 is returned and an error indication is provided.

HPTPX-ABORT-REQ

This primitive is used to cancel a current service request or issue a FAILURE_REQ. The function will issue a TP_U_ABORT_REQ to the peer. Upon successful completion, a value of 0 is returned. Otherwise a value of −1 is returned, and an error indication is provided.

HPTPX-ABANDON-REQ

This primitive is used to abandon a branch by aborting the association and forcing recovery if required. The state of the branch will be evaluated to determine if it can be cleaned up. The returned error indication should be evaluated by the caller to determine the results. A heuristic hazard will be logged if a decision has to be made to complete a transaction since the results of the database are unknown. Upon successful completion, a value of 0 is returned. This implies that the association has been aborted and all branch resources have been cleaned up. Otherwise a 1 is returned and an indication of the returned status is provided.

HPTPX-RESPONSE-REQ

This primitive is used to respond to a callcon__ind that is in conversational mode. Specifically, this function is used to respond to a callcon__ind that had the TPSENDONLY flag set. Upon successful completion, a value of 0 is returned. Otherwise a −1 is returned and an error indication is provided.

HPTPX-ROLLBACK-REQ

This primitive is used to rollback a transaction. A superior will issue a rollback request to its peer. The subordinate will not use the HPTPX__ROLLBACK__REQ. Instead it will issue a HPTPX__ABORT__REQ. Upon successful completion of this function, a value of 0 will be returned. Otherwise a −1 is returned and an error indication is provided.

HPTPX-COMMIT-REQ

This primitive is used to commit a transaction for the client or put the server in the ready state. The superior will issue a commit request in response to a TX__COMMIT, and the subordinate will issue a tp__commit__req to ready the branch to the client. Upon successful completion of this function, a value of 0 will be returned. Otherwise a −1 is returned and an error indication is provided.

BPTPX-PREPARE-REQ

This primitive is used to instruct the subordinates of a transaction to prepare its resources. Upon successful completion of this function, a value of 0 will be returned. Otherwise a −1 is returned and an error indication is provided.

HPTPX-DONE-REQ

This primitive is used to issue a TP__DONE__REQ from the server to acknowledge a commit or rollback ind. If a heuristic status was taken, it is passed by the heuristic flag. Upon successful completion, a value of 0 will be returned. The caller must wait for completion of the transaction. The heuristic logs can be forgotten at this point, and all resources can be released. Otherwise a −1 is returned and a variable is set to indicate the error or the completion indication.

HPTPX-RECOVER-REQ

This primitive is used to recover a branch after a node crash and to restart the modified OSI TP protocol machine of the present invention. A TP-ID is returned for each recover request issued so that the commitment of the transaction can complete. This function must be the first function issued by the CRM so that the RCH (recovery context handle) can be reactivated by BPTPX and incoming recovery requests can be accepted. If the crmod parameter (see Appendix C) is set to −1, then it is assumed that there are no branches to recover. Otherwise, the information for each branch to be recovered is entered. A TP-ID will be returned as the recovery information is accepted, so that any other requests may be mapped to this branch.

HPTPX__DIALOG__IND

This function delivers a new dialog indication to the server CRM. The CRM returns a crm__id. If the CRM is not available, the server HPTPX will issue a Begin Dialogue Rsp (negative) with a diagnostic code of TPSU-NOT-AVAILABLE (transient).

HPTPX__DELIVERIND

This function is used to deliver all other indications to the CRM. When received by the CRM, it indicates a data event. Upon successful completion, this function returns a value of 0. Otherwise a −1 is returned. If the CRM can not accept the indication, HPTPX aborts the dialogue.

Figure 5:
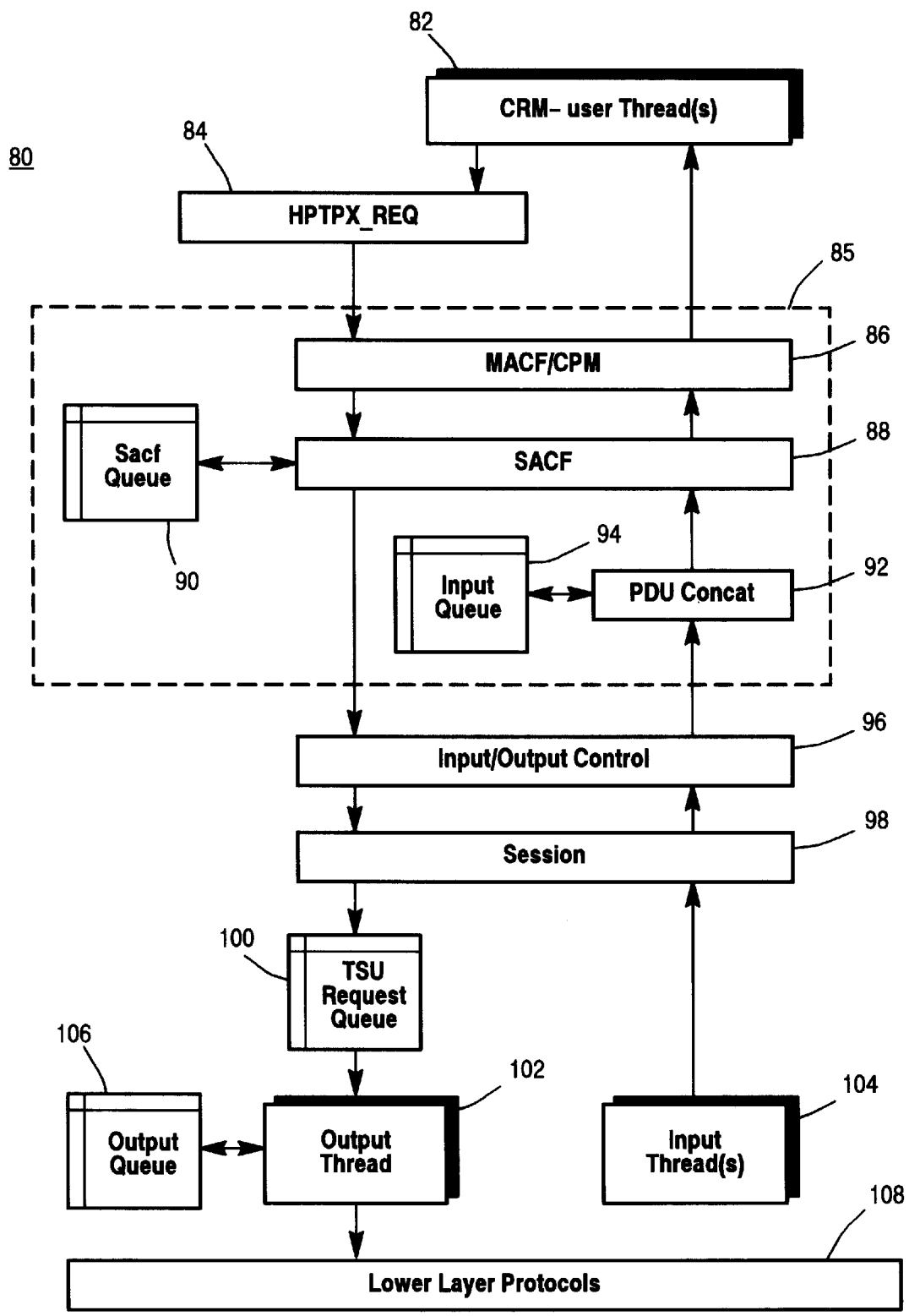
FIG. 5 is a block diagram illustrating the process structure and functional components of a preferred embodiment of apparatus for carrying out the method of the present invention.

FIG. 5 is a block diagram illustrating the process structure and functional components of a preferred embodiment of apparatus 80 for carrying out the method of the present invention. In the present embodiment, the apparatus 80 are implemented in software using the C programming language. As shown, in the present embodiment, the apparatus 80 comprises code 84 that implements the HPTPX interface of the present invention, and a modified OSI TP protocol machine 85 that, as described above, processes concatenated OSI TP services for a given HPTPX service request as a single, atomic event. An input/output control block 96 and a session block 98 control the input and output of data to and from the modified OSI TP protocol machine 85 via an output thread 102 and one or more input threads 104. The session block 98 performs protocol transformations for the session layer of the OSI protocol stack. A TSU request queue collects outgoing requests for processing by the output thread 102, which sends requests out to the network. An output queue 106 stores flow controlled data requests when the network (not shown) is congested. An implementation of lower layer protocols 108 handles the low level communications between nodes.

The modified OSI TP protocol machine 85 of the present invention is based on the standard OSI TP protocol machine defined in the OSI TP Protocol Specification, but has been modified to support the processing of certain combinations of concatenated OSI TP service requests as single, atomic events, while remaining fully compliant with the OSI TP Standard. The modified OSI TP protocol machine 85 comprises a modified MACF protocol machine 86, with its associated CPM, and a modified SACF protocol machine 88. Requests to the SACF protocol machine are queued in a SACF storage queue 90. The modified OSI TP protocol machine further comprises a PDU concat function 92.

Control of logging and management of the transaction trees is kept under the control of the Transaction Manager (TM) (see FIG. 1). The modified MACF protocol machine 86 relinquishes control of branch management to the TM and treats each branch as a separate entity with no correlation to any other branch. The modified OSI TP protocol machine 85 controls all associations needed for TP dialogues and channels. The CRM will solicit the modified OSI TP protocol machine 85 for an AAID when needed, and in the case of added multiple branches to the same transaction tree, it will supply the modified OSI TP protocol machine 85 with the necessary AAID. Recovery is also handled branch by branch. The modified MACF protocol machine 86 does not need to know how the branches are associated. A NULL RCH (recovery context handle) is assumed and incoming association requests are denied until recovery is performed. Once recovery is complete, the RCH is said to be "active".

The modified MACF protocol machine 86 functions in accordance with a modified MACF state table of the present invention. FIG. 6 shows a portion of a modified MACF state table 110 in accordance with the preferred embodiment of the present invention. The complete state table for the modified MACF protocol machine 86 is provided in microfiche Appendix A, referenced above. Referring to FIG. 6, each row of the modified MACF state table 110 defines the actions and state transitions for a given MACF event. In accordance with the present invention, the modified MACF state table is based on the standard MACF state table defined in the OSI TP Protocol Specification, but it contains new MACF events that reflect the new, concatenated service mappings defined in Tables 4 and 5 above. The state numbers in the table match those defined in the standard MACF state table in the OSI TP Protocol Specification.

As an example, the first row of the modified MACF state table 110 defines a new event 112 that represents the concatenated OSI TP services (TP-BEGIN-DIALOGUE-REQ, TP-DATA-REQ, TP-GRANT-CONTROL-REQ) for the HPTPX_CALLCON_REQ primitive of the HPTPX interface. According to the modified MACF state table 110, when an HPTPX_CALLCON_REQ is issued by the CRM, and the modified MACF protocol machine is in state "1", the actions listed in field 114 of the table will be performed, and the modified MACF protocol machine will transition to state "3".

Many of the actions and variables specified in the modified MACF state table 110 are identical to those defined in the OSI TP Protocol Specification for the standard OSI-TP MACF state table. However, since this embodiment of the modified MACF state table is optimized for use in an XATMI environment, many states, variables, actions and events defined in the OSI TP Protocol Specification are not required, and have been eliminated. In particular, since branch management is handled by the TM, the modified MACF state table 110 does not need to support that capability and all synchronizing events associated with that capability have been eliminated in the modified MACF state table 110.

In addition to states, variables, and actions that were able to be eliminated, the modified MACF state table 110 also comprises a number of additional actions needed to support the newly defined events. Table 7 provides a list of these additional actions and the parameter settings/service primitives issued when they are invoked.

TABLE 7

Newly Defined Actions to Support Newly Defined MACF Events

| Action name | Parameter settings/service primitive issued |
| --- | --- |
| ABDDrq | AF-BEGIN-DIALOGUE-DATA req |
| ABDEDrq | AF-BEGIN-DIALOGUE-DATA-ED req |
| ABDGCrq | AF-BEGIN-DIALOGUE-DATA-GC req |
| ABDPrq | AF-BEGIN-DIALOGUE-DATA-ED req |
| ADATAGCrq | AF-DATA-GRANT-CONTROL req |
| ASSNCNF | A-ASSOCIATION cnf (accepted) |
| ASSNCNFR | A-ASSOCIATION cnf (rejected) |
| ATPCrq | AF-TPCALL req |
| CMPCOM | set hptpx_ind to complete<br>set sptype to HPTPX-COMMIT-COMPLETE-IND<br>post HPTPX_DELIVERIND |
| CMPCOMh | set hptpx_ind to complete<br>set sptype to HPTPX-COMMIT-COMPLETE-IND<br>set diagnostic to value of heuristic diag<br>post HPTPX_DELIVERIND |
| RBCOM | set hptpx_ind to complete<br>set sptype to HPTPX-ROLLBACK-COMPLETE-IND<br>post HPTPX_DELIVERIND |

TABLE 7-continued

Newly Defined Actions to Support Newly Defined MACF Events

| Action name | Parameter settings/service primitive issued |
| --- | --- |
| RBCOMh | set hptpx_ind to complete<br>set sptype to HPTPX-ROLLBACK-COMPLETE-IND<br>set diagnostic to value of heuristic diag<br>post HPTPX_DELIVERIND |
| RBCOMhaz | set hptpx_ind to complete<br>set sptype to HPTPX-ROLLBACK-COMPLETE-IND<br>set diagnostic to value of HPTPX_HEUR_HAZ<br>post HPTPX_DELIVERIND |
| RECCOM | set sptype to HPTPX_COMMIT_IND<br>post HPTPX_DELIVERIND |
| TBDATAi | set ase_flags to TPNOTRAN/TPSENDONLY<br>post HPTPX-DIALOGUE-IND |
| TBDcX | set sptype to HPTPX_BEGIN_DIALOGUE_CNF<br>set rollback_flag to NO_ROLLBACK<br>if dialogue_result is rejected_user or rejected_provider<br>set result = REJECT<br>otherwise set result = ACCEPT<br>post HPTPX_DELIVERIND |
| TBDcXR | set sptype to HPTPX_BEGIN_DIALOGUE_CNF<br>set rollback_flag = ROLLBACK<br>set result to REJECT<br>post HPTPX_DELIVERIND |
| TBDEDi | set ase_flags to TPNOTRAN/TPNOREPLY<br>post HPTPX-DIALOGUE-IND |
| TBDGCi | set ase_flags to TPNOTRAN<br>post HPTPX-DIALOGUE-IND |
| TBDPREPi | set ase_flags to TPPREPARE<br>issue HPTPX-DIALOGUE-IND |
| TBDTGCi | post HPTPX-DIALOGUE-IND |
| TBTDATAi | set ase_flags to TPSENDONLY<br>post HPTPX-DIALOGUE-IND |
| TDATAEDi | set oam_flags to OAM_CLOSEOPT<br>set hptpx_ind to HPTPX-DATA-IND<br>post HPTPX_DELIVERIND |
| TDATAi | set hptpx_ind to HPTPX-DATA-IND<br>post HPTPX_DELIVERIND |
| TDATGCi | set oam_flags to OAM_REPLY<br>set hptpx_ind to HPTPX-DATA-IND<br>post HPTPX_DELIVERIND |
| TDRDYi | set oam_flags to OAM_READY<br>set hptpx_ind to HPTPX-DATA-IND<br>post HPTPX_DELIVERIND |
| TDTi | set sptype to HPTPX_DATA_IND<br>set oam_flags to 0<br>post HPTPX_DELIVERIND |
| TPABi | set hptpx_ind to abort<br>set sptype to HPTPX_P_ABORT_IND<br>post HPTPX_DELIVERIND |
| TPABiBTR | set sptype to HPTPX_P_ABORT_IND<br>set rollback_flag to NO_ROLLBACK<br>set diagnostic to HPTPX_NO_HEUR<br>post HPTPX_DELIVERIND |
| TPABiR | set hptpx_ind to abort<br>set sptype to HPTPX_P_ABORT_IND<br>set the rollback_flag to ROLLBACK<br>post HPTPX_DELIVERIND |
| TPABiRH | set hptpx_ind to abort<br>set sptype to HPTPX_P_ABORT_IND<br>set the rollback_flag to ROLLBACK<br>set diagnostic to HPTPX_HEUR_HAZ; |
| TPRi | set hptpx_ind to HPTPX_PREPARE_IND<br>post HPTPX_DELIVERIND |
| TRBi | set sptype to HPTPX_ROLLBACK_IND<br>post HPTPX_DELIVERIND |
| TRYi | set hptpx_ind to HPTPX_READY_IND<br>post HPTPX_DELIVERIND |
| TUABi | set hptpx_ind to abort<br>set sptype to HPTPX_U_ABORT_IND<br>post HPTPX_DELIVERIND |
| TUABiR | set hptpx_ind to abort<br>set sptype to HPTPX_U_ABORT_IND<br>set rollback_flag to ROLLBACK<br>post HPTPX_DELIVERIND |

Additionally, some actions with free-form names as described in A.4.4.4 of ISO/IEC 10026-3 have been redefined for the modified MACF protocol machine 86. Much of the content of the existing actions still applies, but since several variables will no longer be set by the modified MACF protocol machine 110, the contents of the actions have been simplified. The new definitions are as follows:

[INTRB] (initiate rollback)

Initiates rollback at this node.

If ↑nfrb set nfrb to TRUE.

[OWEDONE] (owe a TP-DONE request)

Makes a TP-DONE request owed and allows failure related actions.

if ↑dd set dd to TRUE.

[OWEDONECO] (owe a TP-DONE request after commit indication)

set dd to TRUE.

The modified SACF protocol machine 88 operates in accordance with a modified SACF state table. FIG. 7 shows a portion of a modified SACF state table 116 in accordance with the preferred embodiment of the present invention. A complete modified SACF state table in accordance with the preferred embodiment appears in microfiche appendix B, referenced above. Like the modified MACF state table 110, the modified SACF state table 116 is based on the standard SACF state table specified in the OSI TP Protocol Specification. However, in accordance with the present invention, the modified SACF state table 116 contains new service definitions that are aligned with the newly created MACF events, to further support the processing of concatenated OSI TP service requests as a single, atomic event. Additionally, association management was added directly into the modified SACF state table 116 for better integration. A new state, "association pending," and a new variable, "aap," were added to the modified SACF state table 116 to accomplish this integration. Specifically, the "association pending" state was created to indicate that an association request has been issued but that the association confirm has not been received. The TPCALL information is queued until the association confirm is received. The "aap" variable causes data to be queued in support of data requests issued in SENDONLY mode.

The PDU Concatenator component 92 of the modified OSI TP protocol machine 85 provides the function of collecting inbound OSI-TP PDUs (Protocol Data Units) after the OSI-TP protocol has been successfully decoded, until a valid XATMI-ASE/OSI TP combination is met, as per the BPTPX mappings provided in Tables 4 and 5. It is assumed that the modified OSI TP protocol machine 85 will only accept OSI-TP protocol from a TM that has followed the XATMI and XATMI-ASE protocol specifications. If an invalid sequence is received, the concatenator will initiate a protocol error to the sender and receiver if necessary. Once a valid combination has been collected, those PDUs are concatenated and processed through the modified OSI TP protocol machine 85 as a single atomic event, in accordance with the modified MACF and SACF state tables of the present invention.

FIGS. 8A–8C comprise a table that provides further details of the operation of the PDU CONCAT component of the apparatus of FIG. 5, in accordance with the present invention. The first column lists the valid PDU combinations that the concatenator 92 will recognize. The second column specifies the input to the SACF protocol machine 88 in response to the corresponding recognized PDU combination. The third column specifies the SACF indication type provided to the MACF protocol machine 86 for the given combination, and the fourth column indicates which entry point of the HPTPX interface is issued by the modified MACF protocol machine 86 to the CRM. Thus, the table of FIGS. 8A–8C illustrates the propagation of information from the PDU concatenator 92, through the modified OSI TP protocol machine 85, to a user thread of the CRM 82.

The PDU Concatenator component 92 does not invoke the modified MACF/SACF protocol machines 86, 88 until all PDUs of a given combination have been received. Consequently, a service will not be started unless the tpcall() has been successfully received and not aborted. The MACF/SACF protocol machines are therefore able to process groupings of OSI-TP PDUs as a single, atomic event in accordance with the principles of the present invention.

The modified OSI TP protocol machine 85 of the present invention will automatically recover from node crashes and association failures by attempting to reestablish channel associations with the peer. A CRM is required to synchronize with the modified OSI TP protocol machine 85 at startup by issuing an HPTPX_RECOVER_REQ. If no log records are available, the RCH (recovery context handle) is simply put as active. Any incoming channel requests before this time will be rejected with a retry-later condition.

Log records will not be passed through to the CRM. The HPTPX interface provides the CRM with enough information to construct log data for the TM when appropriate. The CRM-TM interface will maintain heuristic knowledge. The modified OSI TP protocol machine will only maintain heuristic knowledge until a user-defined timer has expired. This information is kept only for recovery purposes to inform a superior of a heuristic decision after the transaction is complete and the association is broken. LOG_DAMAGE_IND will not be generated to the CRM. The AAID/BRID/RECIP AE fields must be maintained by the CRM for recovery purposes. In the event of node crash, this information will be passed in the fields defined by the HPTPX_RECOVER_REQ.

AAIDs are generated by the modified OSI TP protocol machine 85 and used by the CRM when additional branches to a tree are required. The modified OSI TP protocol machine 85 will maintain single branches only and all propagation for commit and rollback is done by the TM. The modified OSI TP protocol machine will not validate AAIDs since it only handles transaction branches, not transaction trees.

As the foregoing illustrates, the present invention is directed to methods and apparatus for optimizing the performance and throughput of OSI TP communications in a distributed transaction processing system. The methods and apparatus of the present invention are particularly advantageous in distributed transaction processing systems that support only a single AP-CRM programming interface, such as, for example, the XATMI programming interface. In the embodiment described above, the HPTPX programming interface and the modified OSI TP protocol machine allow an XATMI-compliant CRM to call and process concatenated OSI-TP services as a single atomic event, thus minimizing context switching (i.e., crossing of process boundaries) between the CRM and OSI TP protocol machine. This improves performance and throughput, while still maintaining full compliance with the OSI TP Standard. Similar modifications could be made to a standard OSI TP protocol machine to provide improved performance for environments that support other AP-CRM interfaces, such as TxRPC and CPI-C. Accordingly, the methods and apparatus of the present invention are by no means limited solely to use in distributed processing systems that support the XATMI interface. Thus, it is understood that changes may be made to the embodiments described above without departing from the broad inventive concepts thereof. The present invention is not limited to the particular embodiments disclosed, but is intended to cover all modifications that are within the spirit and scope of the invention as defined by the appended claims.

TN098
Schaefer et al.
APPENDIX C

HPTPX-CALLCON-REQ include <hptpx.h>

```
int hptpx_callcon_req (
        int                 crm_id,
        tp_output_env_t     *output_env_p,
        tp_return_env_t     *return_env_p,
        int                 ase_flags,
        struct ap_osi_vbuf  *ubuf,
        unsigned long       *aperrno_p )
```

*crm_id*   This id represents the crm-id of the branch.

*output_env_p*   The following members of env_ptr are used for this function:

```
aaid_brid_t    aaid,          /* aaid for branch */
suffix_t       aaid_suffix,   /* aaid suffix for root-node - should be GTRID */
suffix_t       brid_suffix,   /* suffix to identify branch- should be XID */
rem_tpsut_t    rem_tpsut,     /* encoded remote tpsut and size */
char           recip_ae[ALIAS_LENGTH + 1] /* alias recip ae - UPPER CASE */
```

*return_env_p*   The following members of return_env_ptr are used for this function:

```
aaid_brid_t    aaid,
aaid_brid_t    brid,
```

*ase_flags*   The valid flags (ase_flags from the CRM should be passed, HPTPX will interpret the flags ) as follows:

TPNOTRAN
   If the caller is in transaction mode and this flag is set, the service invoked performed on behalf of the caller's transaction. If the service does not support transactions, this flag must be set when the caller is in transaction mode.

TPNOREPLY
   This flag indicates that a reply is not expected. This is only used when TPNOTRAN is also set.

TPSENDONLY
   This flag indicates that the service will be confirmed.

TPPREPARE
   This flag indicates that the service is ready to be prepared.

*ubuf*   Data buffer from CRM

ERRORS

HPTPX_NO_PROVIDER       The HPTPX provider is unavailable.

HPTPX_RESOURCE_ERR      HPTPX can not acquire necessary resources needed to complete this request.

Schaefer et al.
APPENDIX C

| | | |
|---|---|---|
| HPTPX_INVALID_REQUEST | | HPTPX experienced a protocol error making this request invalid. Check the LOG file for more information. |
| HPTPX_ASSOC_NOT_AVAIL | | XSACF table is full. The FREEOLD ADMIN command could be issued. |
| HPTPX_BAD_AE_NAME | | The recip_ae value passed in the structure pointed to by env_ptr is not a valid AE alias in the configuration tables. |

HPTPX-DATA-REQ include <hptpx.h>

```
int  hptpx_data_req (
         int                   tp_id,
         int                   CRM_flags,
         struct ap_osi_vbuf    *ubuf,
         unsigned long         *apermo_p )
```

*tp_id*   This argument is supplied by the caller to specify which dialogue HPTPX should use.

*flags*   One of the following flags from CRM_FLAGS are required:

CRM_CLOSEOPT
        This flag specifies that the dialogue will be closed after this data is sent. This is used in non-transactional dialogues from xatmi-reply.

CRM_REPLY
        This flag indicates that a reply is expected.

CRM_READY
        This flag indicates that a subordinate is ready to commit. Use after receiving a CALLCON IND with TPPREPARE.

*ubuf*   Data buffer from CRM. HPTPX will encode the PCI in the CRM data. It will always be the PCI of XATMI.

ERRORS

| | |
|---|---|
| HPTPX_NO_PROVIDER | The HPTPX provider is unavailable. |
| HPTPX_RESOURCE_ERR | HPTPX can not acquire necessary resources needed to complete this request. |
| HPTPX_INVALID_REQUEST | HPTPX experienced a protocol error making this request invalid. Check the LOG file for more information. |
| HPTPX_INVALID_ID | The TP-ID passed on this command is invalid. |

TN098
Schaefer et al.
APPENDIX C

HPTPX-ABORT-REQ

```
include <hptpx.h> int hptpx_abort_req (
    int             tp_id,
    short int       heuristic_flag, struct ap_osi_vbuf  *ubuf,
    unsigned long   *aperrno_p )
```

*tp-id*    This argument is supplied by the caller to specify which dialogue HPTPX should use.

*heuristic_flag*    Has the following values:

| | | |
|---|---|---|
| | HPTPX_NO_HEUR | value 0 |
| | HPTPX_HEUR_MIX | value 1 |
| | HPTPX_HEUR_HAZ | value 2 |

*ubuf*    Optional Data buffer from CRM

ERRORS

| | |
|---|---|
| HPTPX_NO_PROVIDER | The HPTPX provider is unavailable. |
| HPTPX_RESOURCE_ERR | HPTPX can not acquire necessary resources needed to complete this request. |
| HPTPX_INVALID_REQUEST | HPTPX experienced a protocol error making this request invalid. Check the LOG file for more information. |
| HPTPX_INVALID_ID | The TP-ID passed on this command in invalid. |
| HPTPX_ROLLBACK_COMPLETE | This transaction has completed rollback |

HPTPX-ABANDON-REQ

```
include <hptpx.h> int hptpx_abandon_req (
    int             tp_id,
    unsigned long   *aperrno_p )
```

*tp-id*    This argument is supplied by the caller to specify which dialogue HPTPX should use.

ERRORS

| | |
|---|---|
| HPTPX _NO_PROVIDER | The HPTPX provider is unavailable. |
| HPTPX_RESOURCE_ERR | HPTPX can not acquire necessary resources needed to complete this request. |
| HPTPX_INVALID_ID | The TP-ID passed on this command in invalid. |

TN098
Schaefer et al.
APPENDIX C

| | | |
|---|---|---|
| HPTPX_IND_EXPECTED | | The HPTPX branch resources could not be freed; a confirmation is still awaited from the peer. |
| HPTPX_COMMIT_RB_EXPECTED | | The HPTPX branch resources could not be freed; HPTPX is awaiting a commit or rollback order from the CRM |
| HPTPX_COMMIT_COMPLETE HAZARD | | The branch resources were successfully freed and the commit confirm with a heuristic hazard was passed back to the superior. |
| HPTPX_ROLLBACK_COMPLETE HAZARD | | The branch resources were successfully freed and the transaction rolled back. |

HPTPX-RESPONSE-REQ

```
include <hptpx.h> int hptpx_response_req (
        int             tp_id,
        int             result,
        unsigned long   *aperrno_p )
```

*tp-id*  This argument is supplied by the caller to specify which dialogue HPTPX should use.

*result*  An integer value which indicates the result of scheduling the OLTP transaction. A value of 0(ACCEPT) is a successful schedule of the transaction whereas a 1 (REJECT) is a bad status.

ERRORS

| | |
|---|---|
| HPTPX_NO_PROVIDER | The HPTPX provider is unavailable. |
| HPTPX_RESOURCE_ERR | HPTPX can not acquire necessary resources needed to complete this request. |
| HPTPX_INVALID_REQUEST | HPTPX experienced a protocol error making this request invalid. Check the LOG file for more information. |
| HPTPX_INVALID_ID | The TP-ID passed on this command in invalid. |

HPTPX-ROLLBACK-REQ

```
include <hptpx.h> int hptpx_rollback_req (
        int             tp_id,
        unsigned long   *aperrno_p)
```

TN098
Schaefer et al.
APPENDIX C

*tp_id* This argument is supplied by the caller to specify which dialogue HPTPX should use.

ERRORS

HPTPX_NO_PROVIDER          The HPTPX provider is unavailable.

HPTPX_RESOURCE_ERR         HPTPX can not acquire necessary resources needed to
                           complete this request.

HPTPX_INVALID_REQUEST      HPTPX experienced a protocol error making this request
                           invalid. Check the LOG file for more information.

HPTPX_INVALID_ID           The TP-ID passed on this command is invalid.

HPTPX-COMMIT-REQ

```
include <hptpx.h> int hptpx_commit_req (
        int           tp_id,
        unsigned long *aperrno_p )
```

*tp_id* This argument is supplied by the caller to specify which dialogue HPTPX should use.

ERRORS

HPTPX_NO_PROVIDER          The HPTPX provider is unavailable.

HPTPX_RESOURCE_ERR         HPTPX can not acquire necessary resources needed to
                           complete this request.

HPTPX_INVALID_REQUEST      HPTPX experienced a protocol error making this request
                           invalid. Check the LOG file for more information.

HPTPX_INVALID_ID           The TP-ID passed on this command is invalid.

HPTPX-PREPARE-REQ

```
include <hptpx.h> int hptpx_prepare_req (
        int           tp_id,
        unsigned long *aperrno_p )
```

*tp_id* This argument is supplied by the caller to specify which dialogue HPTPX should use.

ERRORS

HPTPX_NO_PROVIDER          The HPTPX provider is unavailable.

HPTPX_RESOURCE_ERR         HPTPX can not acquire necessary resources needed to
                           complete this request.

TN098
Schaefer et al.
APPENDIX C

| | | |
|---|---|---|
| HPTPX_INVALID_REQUEST | | HPTPX experienced a protocol error making this request invalid. Check the LOG file for more information. |
| HPTPX_INVALID_ID | | The TP-ID passed on this command isinvalid. |

HPTPX-DONE-REQ include <hptpx.h>

```
int hptpx_done_req (
        int             tp_id,
        short int       heuristic_flag,
        unsigned long   *aperrno_p )
```

*tp_id*    This argument is supplied by the caller to specify which dialogue HPTPX should use.

*heuristic_flag*    Has the following values:
    HPTPX_NO_HEUR       value 0
    HPTPX_HEUR_MIX      value 1
    HPTPX_HEUR_HAZ      value 2

ERRORS

| | |
|---|---|
| HPTPX_NO_PROVIDER | The HPTPX provider is unavailable. |
| HPTPX_RESOURCE_ERR | HPTPX can not acquire necessary resources needed to complete this request. |
| HPTPX_INVALID_REQUEST | HPTPX experienced a protocol error making this request invalid. Check the LOG file for more information. |
| HPTPX_INVALID_ID | The TP-ID passed on this command is invalid. |
| HPTPX_ROLLBACK_COMPLETE | The rollback of the transaction is complete. |
| HPTPX_COMMIT_COMPLETE | The commitment of the transaction is complete. |

HPTPX-RECOVER-REQ include <hptpx.h>

```
int hptpx_recover_req (
        int               crm_id,
        tp_output_env_t   *output_env_p,
        unsigned long     *aperrno_p )
```

*crm_id*    This argument is supplied by the caller to specify which id HPTPX should use when posting indications concerning this branch. If this is -1 then there are no branches to recover.

*output_env_p*    The following members of output_env_ptr are used for this function:

aaid_brid_t       aaid,       /* Encoded value of the aaid of the branch to be recovered */

TN098
Schaefer et al.
APPENDIX C

```
           aaid_bird_t          brid,      /* Encoded value of the brid of the branch to be recovered */
           char  recip_ae[ ALIAS_LENGTH+1],    /* The recip_ae alias (Upper case ) for the branch to
                                                  be recovered.*/
           short int  recover_flag.    /* May contain the following values
                                          HPTPX_RECOVERY_INCOMPLETE       value 0
                                          HPTPX_RECOVERY_COMPLETE         value 1
                                */
           short int   superior_subordinate_flag,    /* This flag indicates the relative position of the
                                                        branch. It may contain the following values
                                                        HPTPX_SUPERIOR          value 0
                                                        HPTPX_SUBORDINATE       value 1
                                                   */
           short int   heuristic_flag.,      /* May contain the following values
                                                HPTPX_NO_HEUR            value 0
                                                HPTPX_ HEUR_MIX          value 1
                                                HPTPX_ HEUR_HAZ          value 2
                                             */
```

ERRORS

| | |
|---|---|
| HPTPX_NO_PROVIDER | The HPTPX provider is unavailable. |
| HPTPX_RESOURCE_ERR | HPTPX can not acquire necessary resources needed to complete this request. |
| HPTPX_INVALID_REQUEST | HPTPX experienced a protocol error making this request invalid. Check the LOG file for more information. |
| HPTPX_BAD_AE_NAME | The recip_ae value passed in the structure pointed to by output_env_ptr is not a valid AE alias in the configuration tables. |

HPTPX_ DIALOGUE_IND include <hptpx.h>

```
int  hptpx_dialogue_ind (
         int                 tp_id,
         tp_return_env_t     *return_env_p,
         unsigned long       ase_flags,
         struct ap_osi_vbuf  *ubuf)
```

*tp_id*   The tp_id of the new HP-TP instance.

*return_env_p*   The following fields are used for this indication. These fields are necessary for recovery
                 and should be stored by the CRM.

```
           aaid_brid_t       aaid,      /* Encoded aaid of the branch to recover */
           aaid_brid_t       brid,      /* Encoded brid of the branch to recover */
           char                         recip_ae[ALIAS_LENGTH+1]  /* Recipient AE alias of the
                                                                     peer */
```

42

TN098
Schaefer et al.
APPENDIX C

*ase_flags*   The following flags may be set:

TPNOTRAN
If set, the caller is in non-transaction mode, and the service invoked will be performed on behalf of the caller.

TPNOREPLY
If set, indicates that a reply is not expected. This will be true only if TPNOTRAN is also set.

TPSENDONLY
If set, indicates that this dialogue is in conversation mode. OSI-TP will respond to this dialogue indication based on status returned from this call.

TPPREPARE
If set indicates the caller is in transaction mode and the branch has been directed to prepare.

*ubuf*   Data buffer from CRM

HPTPX_DELIVERIND

```
include <hptpx.h> int hptpx_deliverind(
        int                crm_id,
        hptpx_ind_t        hptpx_ind,
        struct ap_osi_vbuf *ubuf)
```

*crm_id*   This id represents the crm-id of the branch.

*hptpx_ind*   This is a structure defined below:

```
typedef union hptpx_ind { unsigned long sptype;           /* type of indication */
        struct data {
                unsigned long sptype;           /* HPTPX_DATA_IND */
                unsigned long CRM_flags;        /* CRM_REPLY, CRM_CLOSEOPT,
                                                   CRM_READY */
        } data;
        struct complete {
                unsigned long sptype;           /* HPTPX_COMMIT_COMPLETE_IND
                                                   HPTPX_ROLLBACK_COMPLETE_IND *//
                short int     diagnostic;       /* 0 = HPTPX_NO_HEUR_
                                                   1 = HPTPX_HEUR_MIX ,
                                                   2 = HPTPX_HEUR_HAZ */
        } complete;
        struct diag_cnf {
                unsigned long sptype;           /* HPTPX_BEGIN_DIALOGUE_CNF */
                short int     rollback_flag;    /* 0 = NO_ROLLBACK ,
                                                   1 = ROLLBACK */
                short int     result;           /* 0 = ACCEPT, 1 = REJECT */
        } diag_cnf;
        struct abort{
```

43

TN098
Schaefer et al.
APPENDIX C

```
          unsigned long sptype;    /*HPTPX_P_ABORT_IND or HPTPX_U_ABORT_IND */
          short int    rollback_flag;   /* 0 =NO_ROLLBACK,
                                           1 = ROLLBACK */
       } abort;
    } hptpx_ind_t;
``` sptype may be the following:

| *Superior side* | *Subordinate side* |
|---|---|
| HPTPX_BEGIN_DIALOGUE_CNF | HPTPX_PREPARE_IND |
| HPTPX_U_ABORT_IND | HPTPX_U_H   HPTPX_U_ABORT_IND |
| HPTPX_P_ABORT_IND | HPTPX_P_ABORT_IND |
| HPTPX_DATA_IND | HPTPX_DATA_IND |
| HPTPX_READY_IND | HPTPX_COMMIT_IND |
| HPTPX_COMMIT_COMPLETE_IND | HPTPX_ROLLBACK_IND |
| HPTPX_ROLLBACK_COMPLETE_IND | |

*ubuf*   Data buffer to CRM for sptypes HPTPX_DATA_IND and HPTPX_U_ABORT_IND
         optional for HPTPX_READY_IND.

What is claimed is:

1. A protocol machine for providing OSI TP communication services in a distributed transaction processing system, the protocol machine concatenating multiple OSI TP service requests associated with a service primitive of one of a plurality of AP-CRM interfaces and processing the concatenated OSI TP service requests as a single, atomic event.

2. The protocol machine recited in claim 1, wherein said modified OSI TP protocol machine comprises a modified MACF protocol machine that operates in accordance with a modified MACF state table that is modified from the MACF state table specified in the OSI TP Protocol Specification, the modified MACF state table defining a new event for said concatenated OSI TP services that specifies a combined set of actions that support the processing of said concatenated OSI TP services as a single atomic event.

3. The protocol machine recited in claim 2, wherein selected states, variables, actions, and events of the MACF state table specified in the OSI TP Protocol Specification that are unrelated to said one AP-CRM interface are omitted from the modified MACF state table.

4. The protocol machine recited in claim 2, wherein the modified MACF protocol machine relinquishes branch management capability to a Transaction Manager of the distributed transaction process system, and wherein all synchronizing events in the MACF state table specified in the OSI TP Protocol Specification that are associated with branch management are omitted from the modified MACF state table.

5. The protocol machine recited in claim 2 wherein said modified OSI TP protocol machine further comprises a modified SACF protocol machine that operates in accordance with a modified SACF state table that is modified from the SACF state table specified in the OSI TP Protocol Specification, the modified SACF state table including at least one new service primitive that corresponds to the new event defined in the modified MACF state table.

6. The protocol machine recited in claim 5, wherein the modified SACF protocol machine further incorporates association management capabilities by defining, in the modified SACF state table, an association pending state that indicates that an association request has been issued but that an association confirm has not been received.

7. The protocol machine recited in claim 1 further comprising a concatenator that collects OSI TP protocol data units (PDUs) received from a peer node until a combination of PDUs corresponding to a given service primitive of the AP-CRM interface has been received, and that passes the collected combination of OSI TP PDUs to the modified MACF and SACF protocol machines for processing as a single atomic event.

8. Apparatus providing OSI TP services to a communication resource manager (CRM) that supports one of a plurality of AP-CRM programming interfaces in a distributed transaction processing system, said apparatus comprising:

a CRM-OSI TP programming interface that maps each service of said AP-CRM programming interface to a respective, single service request of said CRM-OSI TP programming interface, ones of said single service requests of said CRM-OSI TP programming interface representing a concatenation of a plurality of OSI TP services to which the respective service of said AP-CRM programming interface is mapped; and a modified OSI TP protocol machine that responds to one of said single service requests of said CRM-OSI TP programming interface by concatenating the OSI TP service requests that said single service request represents, and that processes the concatenated OSI TP service requests as a single atomic event to generate a string of OSI TP protocol data units to execute the requested service.

9. The apparatus recited in claim 8 wherein said modified OSI TP protocol machine comprises a modified MACF protocol machine that operates in accordance with a modified MACF state table that is modified from the MACF state table specified in the OSI TP Protocol Specification, the modified MACF state table defining a new event for each of said ones of service requests of said CRM-OSI TP programming interface, the modified MACF state table specifying, for each of said new events, a combined set of actions that support the processing of the concatenated OSI TP services to which said service request maps, as a single atomic event.

10. The apparatus recited in claim 9, wherein selected states, variables, actions, and events of the MACF state table specified in the OSI TP Protocol Specification that are unrelated to said one AP-CRM interface are omitted from the modified MACF state table.

11. The apparatus recited in claim 9, wherein the modified MACF protocol machine relinquishes branch management capability to a Transaction Manager of the distributed transaction process system, and wherein all synchronizing events in the MACF state table specified in the OSI TP Protocol Specification that are associated with branch management are omitted from the modified MACF state table.

12. The apparatus recited in claim 9, wherein said modified OSI TP protocol machine further comprises a modified SACF protocol machine that operates in accordance with a modified SACF state table that is modified from the SACF state table specified in the OSI TP Protocol Specification, the modified SACF state table including new service primitives that correspond to the new events defined in the modified MACF state table.

13. The apparatus recited in claim 12, wherein the modified SACF protocol machine further incorporates association management capabilities by defining, in the modified SACF state table, an association pending state that indicates that an association request has been issued but that an association confirm has not been received.

14. The apparatus recited in claim 8, further comprising a concatenator that collects OSI TP protocol data units (PDUs) received from a peer node until a combination of PDUs corresponding to a given service primitive of said one AP-CRM interface has been received, and that passes the collected combination of OSI TP PDUs to the modified MACF and SACF protocol machines for processing as a single atomic event.

15. The apparatus recited in claim 8, wherein said one AP-CRM interface comprises the XATMI interface.

16. Apparatus providing OSI TP communication services in a distributed transaction processing system implemented in accordance with the X/Open Distributed Transaction Processing (DTP) model architecture and supporting only the XATMI AP-CRM interface of said X/Open DTP model, said apparatus comprising:

a CRM-OSI TP programming interface that maps each service of the XATMI ASE of said XATMI interface to a respective, single service request of said CRM-OSI TP programming interface, ones of said single service requests of said CRM-OSI TP programming interface representing a concatenation of a plurality of OSI TP services to which the respective service of XATMI ASE is mapped in accordance with the XATMI Specification; and a modified OSI TP protocol machine that responds to one of said single service requests of said CRM-OSI TP programming interface by concatenating the OSI TP service requests that said single service request represents, and that processes the concatenated OSI TP service requests as a single atomic event to generate a string of OSI TP protocol data units to perform the requested service.

17. The apparatus recited in claim 16 wherein said modified OSI TP protocol machine comprises a modified MACF protocol machine that operates in accordance with a modified MACF state table that is modified from the MACF state table specified in the OSI TP Protocol Specification, the modified MACF state table defining a new event for each of said ones of service requests of said CRM-OSI TP programming interface, the modified MACF state table specifying, for each of said new events, a combined set of actions that support the processing of the concatenated OSI TP services to which said service request maps, as a single atomic event.

18. The apparatus recited in claim 17, wherein selected states, variables, actions, and events of the MACF state table specified in the OSI TP Protocol Specification that are unrelated to the XATMI interface are omitted from the modified MACF state table.

19. The apparatus recited in claim 17, wherein the modified MACF protocol machine relinquishes branch management capability to a Transaction Manager of the distributed transaction process system, and wherein all synchronizing events in the MACF state table specified in the OSI TP Protocol Specification that are associated with branch management are omitted from the modified MACF state table.

20. The apparatus recited in claim 17, wherein said modified OSI TP protocol machine further comprises a modified SACF protocol machine that operates in accordance with a modified SACF state table that is modified from the SACF state table specified in the OSI TP Protocol Specification, the modified SACF state table including new service primitives that correspond to the new events defined in the modified MACF state table.

21. The apparatus recited in claim 20, wherein the modified SACF protocol machine further incorporates association management capabilities by defining, in the modified SACF state table, an association pending state that indicates that an association request has been issued but that an association confirm has not been received.

22. The apparatus recited in claim 16, further comprising a concatenator that collects OSI TP protocol data units (PDUs) received from a peer node until a combination of PDUs corresponding to a given service request of said CRM-OSI TP programming interface has been received, and that passes the collected combination of OSI TP PDUs to the modified MACF and SACF protocol machines for processing as a single atomic event.

23. A method for increasing the performance of OSI TP communications between nodes in a distributed transaction processing system, said method comprising the steps of:
issuing from a first node of the system a service request of an AP-CRM interface to initiate communication with a second node of the system;
concatenating a plurality of OSI TP service requests to which said service request of the AP-CRM maps;
processing the concatenated OSI TP service requests as a single atomic event in a modified OSI TP protocol machine to produce a series of OSI TP protocol data units for said OSI TP service requests.

24. The method recited in claim 23, wherein said AP-CRM interface comprises the XATMI interface, and wherein the OSI TP service requests to which said service request of the XATMI interface maps are specified in the XATMI Specification.

25. The method recited in claim 23, wherein said processing step comprises passing the concatenated OSI TP service requests through a modified MACF protocol machine of said modified OSI TP protocol machine that operates in accordance with a modified MACF state table that defines a new event for said concatenated OSI TP services, said new event definition specifying a combined set of actions that support the processing of said concatenated OSI TP services as a single atomic event.

26. The method recited in claim 25, wherein said processing step further comprises relinquishing branch management capability to a Transaction Manager of said distributed transaction processing system, and further wherein all synchronizing events in the MACF state table specified in the OSI TP Protocol Specification that are associated with branch management are omitted from the modified MACF state table.

27. The method recited in claim 23, wherein said concatenating and processing steps are initiated through a service request to a CRM-OSI TP programming interface that maps each service of said AP-CRM programming interface to a respective, single service request of said CRM-OSI TP programming interface, ones of said single service requests of said CRM-OSI TP programming interface representing a concatenation of a plurality of OSI TP services to which the respective service of said AP-CRM programming interface is mapped.

28. The method recited in claim 23, further comprising the steps of:
receiving at the first node a sequence of OSI TP protocol data units (PDUs) transmitted from the second node;
collecting successive OSI TP PDUs until all of the OSI TP PDUs associated with a particular service of said AP-CRM interface have been received;
concatenating said received OSI TP PDUs associated with said service; and
passing the concatenated OSI TP PDUs through said modified OSI TP protocol machine at said first node for processing therein as a single atomic entity.

29. A method for increasing the performance of OSI TP communications between nodes in a distributed transaction processing system, said method comprising the steps of:
receiving at a first node a sequence of OSI TP protocol data units (PDUs) transmitted from a second node;
collecting successive OSI TP PDUs until all of the OSI TP PDUs associated with a particular service of an AP-CRM interface have been received;
concatenating said received OSI TP PDUs associated with said service; and
passing the concatenated OSI TP PDUs through a modified OSI TP protocol machine at said first node for processing therein as a single atomic entity.

30. The method recited in claim 29, wherein said AP-CRM interface comprises the XATMI interface.

* * * * *